United States Patent [19]
Lin

[11] Patent Number: 6,137,856
[45] Date of Patent: Oct. 24, 2000

[54] GENERIC ARCHITECTURES FOR BACKPROJECTION ALGORITHM

[75] Inventor: Wen-Tai Lin, Niskayuna, N.Y.

[73] Assignee: General Electric Company, Schenectady, N.Y.

[21] Appl. No.: 09/211,162

[22] Filed: Dec. 14, 1998

[51] Int. Cl.[7] .................................................. A61B 6/03
[52] U.S. Cl. ................................................ 378/4; 378/901
[58] Field of Search .................................. 378/4, 15, 901

[56] References Cited

U.S. PATENT DOCUMENTS

| | | |
|---|---|---|
| 5,047,931 | 9/1991 | Lin .............................................. 378/14 |
| 5,473,654 | 12/1995 | Kotian et al. ................................ 378/4 |

Primary Examiner—David V. Bruce
Attorney, Agent, or Firm—Jill M. Breedlove; Douglas E. Stoner

[57] ABSTRACT

A method and apparatus are provided for updating an image pixel in both ray-driven and pixel-driven tomographic systems. The method includes the steps of determining (300) a distance and a ray angle of the pixel from an X-ray source of the ray-driven tomographic system and retrieving (302) a plurality of projection data elements based upon the ray angle. The method further includes the steps of retrieving (304) a corresponding set of interpolation values from a lookup table based upon the determined distance and ray angle and multiplying (306) the interpolation value by a respective projection data element. The method also includes the step of summing (308) the multiplied projection data elements and interpolation values.

35 Claims, 18 Drawing Sheets

$f(x, y) = (\theta_1 \cdot g_2 + \theta_2 \cdot g_1)/(\theta_1 + \theta_2)$ (a) Conventional pixel-driven (CPD)

$f(x, y) = (dr \cdot g_1 + dl \cdot g_2)/(dr + dl)$ (b) Scan-line pixel-driven (SLPD)

$f(x, y) = (L_1 \cdot g_1 + L_2 \cdot g_2)/(L_1 + L_2)$ (c) Line-integral ray-driven (LIRD)

$f(x, y) = (a_1 \cdot g_1 + a_2 \cdot g_2)/(a_1 + a_2)$ (d) Strip-integral ray-driven (SIRD)

$r = 0.5$, $A_O = 0$ $r > 0.5$, $A_O = 2\ r^2 - r \sin \theta$
where $\theta = \cos^{-1}(0.5/r)$

GENERIC ARCHITECTURES FOR BACKPROJECTION ALGORITHM

BACKGROUND OF THE INVENTION

The field of the invention relates to computer tomography and more particularly to image processing as it relates to computer tomography.

Conventional computer tomography (CT) machines use pixel-driven algorithms to reconstruct images for fan-beam x-ray sources. The conventional pixel-driven (CPD) approach normally is adapted to scan through each pixel location in raster-scan fashion, and find the angle of the ray that passes through each pixel grid for each view (snapshot). From the angle, a pair of corresponding ray numbers adjacent to the underlying pixel are determined. The pixel is then updated by adding a new value interpolated from the corresponding ray data. In a pipeline implementation, this type of backprojection module requires (1) an arc-tangent function, which may be implemented with a 2K by 32 bit table, (2) a full-size projection data buffer (2K by 32 bits), and (3) two reciprocal tables (each having a size of 4K by 16 bits). Because of the necessity of accommodating a wide variety of reconstruction geometries and field of views (FOVs), these tables are typically implemented in high speed static RAM (SRAM). The use of these full-size SRAM tables become a bottleneck to further reducing the hardware complexity in a parallel or pipeline processing environment.

Various efforts have been attempted in the past to try to simplify the CPD approach so that the backprojection and forward projection computations could be implemented in VLSI systems. Recent efforts have included an attempt to design a VLSI chip capable of reconstructing a 12-bit 1024 by 1024 pixel image from 1024 views. While these efforts have increased the speed of CT computations by using multiple VLSI processing units, none of these efforts have resulted in the maintenance of high image quality. On the contrary, some of these improvements have been made at the expense of good image quality. Because of the importance of CT, a need exists for improved methods and apparatus for simplifying the processing complexity of CT.

BRIEF SUMMARY OF THE INVENTION

A method is provided for updating an image pixel in both ray-driven and pixel-driven tomographic systems. The method includes the steps of determining a distance and a ray angle of the pixel from an X-ray source of the ray-driven tomographic system and retrieving a plurality of projection data elements based upon the ray angle. The method further includes the steps of retrieving a corresponding set of interpolation weights from a lookup table based upon the determined distance and ray angle and multiplying the projection data elements by a respective set of interpolation weights. The method also includes the step of summing the multiplied projection data elements and interpolation weights.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF THE INVENTION

Figure 1:
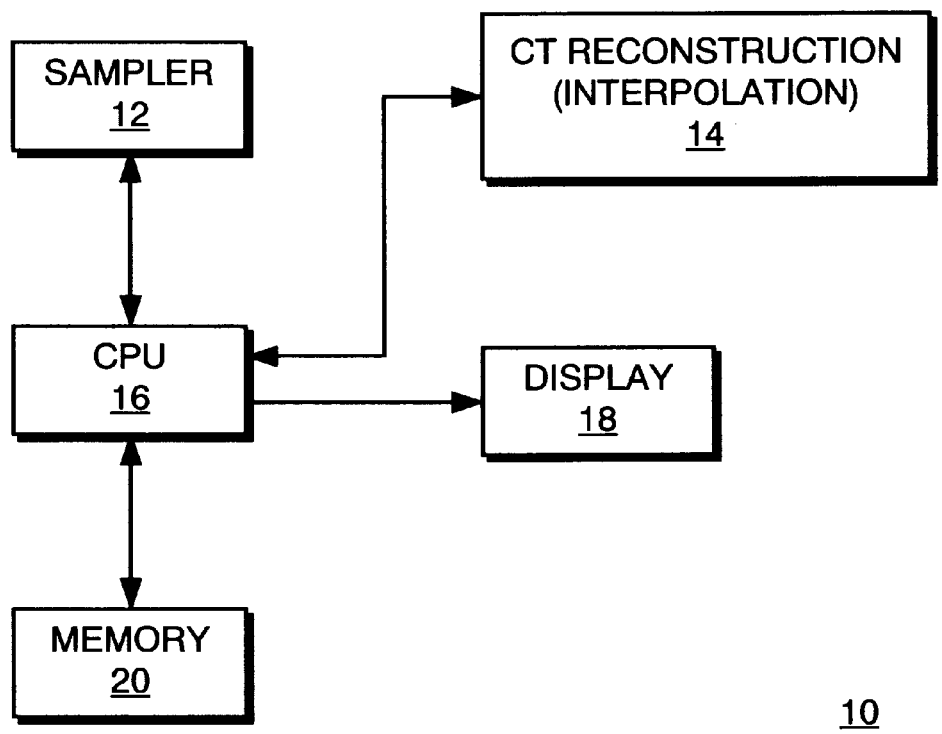
FIG. 1 is a block diagram of a CT system under an illustrated embodiment of the invention.

FIG. 1 depicts a computed tomography (CT) imaging system 10, generally, in accordance with an illustrated embodiment of the invention. Included within the system 10 is a central processing unit (CPU) 16, a sampling device 12, and other image support and processing devices 14, 18, 20. The sampling device 12 may include an X-ray source and image detecting array along with actuating devices. The image support devices 14, 18, 20 include a memory 20, display 18 and a number of CT reconstruction (interpolation) devices 14.

The description of system 10 provided herein addresses: improving image quality with the use of a strip-integral, ray-driven algorithm by which image artifacts caused by spatial aliasing can be further reduced by up to 30%; reducing hardware complexity by eliminating a number of SRAM tables; replacing the arc-tangent table with a ray-slope buffer so that the ray-slope buffer, together with the filtered view data buffer, can be reduced in size in a parallel processing system; and providing at the processor array level, a ray-tracing process to facilitate the data transfer via neighborhood communication.

Generally speaking, a ray-tracing architecture organizes identical processing elements (PEs) in a linear or mesh-connected fashion. A PE (in this case a backprojection module) is provided for the reconstruction of a single pixel or a subimage square. Each filtered projection value ($G_i$) is associated with a slope ($s_i$) such that, together with the current X-ray source position (denoted by ($x_s,y_s$)), the intersection points, ($x_i,y_j$), of a ray with any of the horizontal pixel lines (e.g., $y=y_j$) or vertical pixel lines (e.g., $x=x_i$) are calculated as follows:

$$x_i = x_s + s_{ri}(y_j - y_s) \quad (1)$$

or $$y_j = y_s + s_i(x_i - x_s), \quad (2)$$

where $s_{ri}=1/s_i$ is a reciprocal slope of the $i^{th}$ ray. Within the domain of each PE's subimage square, obtaining accurate intersection locations (either along the vertical or horizontal pixel lines) is an important step, since one could use it to find the nearest rays associated with each pixel in pixel-driven algorithms. Similarly, at the system level one could treat the partitioned subimage areas as regular blocks divided by several border lines. Thus, by calculating the intersection points associated with the border lines of these blocks, it is rather straightforward to transfer the ray data (which is composed of a slope and a projection value) from one PE to another via neighborhood communication. In both applications the same ray data are traced along the paths of X-ray propagation. In this specification the word ray-tracing is an architectural concept for associating each pixel or PE with its relevant ray data, whereas, pixel-driven and ray-driven are referred to as algorithmic concepts (i.e., ways to update each pixel with the associated ray data) for backprojection and forward projection.

Figure 2:
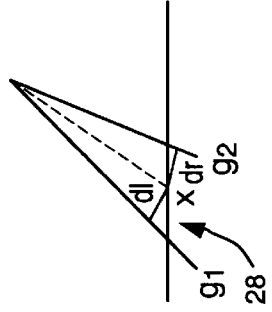
FIG. 2 depicts a conventional pixel driven (CPD) interpolation scheme used by the system of FIG. 1 for updating an image pixel.
Figure 3:
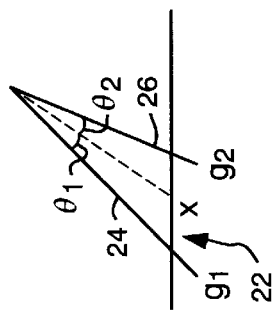
FIG. 3 depicts a scan line pixel driven (SLPD) interpolation scheme used by the system of FIG. 1 for updating an image pixel.
Figure 4:
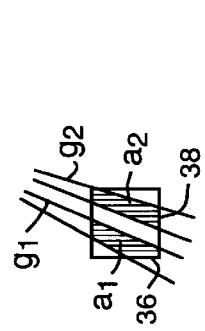
FIG. 4 depicts a line integral ray driven (LIRD) interpolation scheme used by the system of FIG. 1 for updating an image pixel.
Figure 5:
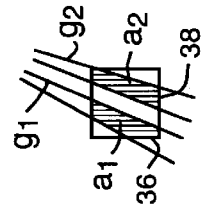
FIG. 5 depicts a strip integral ray driven (SIRD) interpolation scheme used by the system of FIG. 1 for updating an image pixel.

During the process of back projection, each pixel takes on values interpolated from the adjacent rays with different weighting criteria. FIGS. 2–5 depicts four interpolation schemes. Each uses different methods to update the pixel's intensity during backprojection. FIG. 2 depicts a conventional pixel-driven (CPD) approach which uses angles between the underlying pixel 22 and its nearest left ray 24 and right ray 26 for interpolation. FIG. 3 depicts a scan-line pixel-driven (SLPD) approach, which uses distances from the pixel 28 to its adjacent rays. FIG. 4 depicts a line-integral ray-driven (LIRD) approach which is used to compute the length 30 of the ray segment crossing a pixel square 34 for interpolation, and FIG. 5 depicts a strip-integral ray-driven (SIRD) approach which is used to estimate the area 38.

In the pixel-driven algorithm, a pixel is regarded as a grid point in the rectangular coordinate system, while in the ray-driven algorithm, a pixel is regarded as a solid square. As illustrated in FIGS. 2 through 4, the ray is assumed to have infinitesimal width, while in FIG. 5 the ray has some finite width.

In the following sections the three ray-tracing architectures are presented in greater detail. Each architecture is designed to trace the ray data in its own fashion and to update the pixels using a specific algorithm. In one section PE configurations and data distribution methods are discussed. In another section, the implementation of the SIRD algorithm is discussed, wherein pixels are traced during ray propagation. A recursive algorithm for implementing the $R^{-2}$ function is presented, followed by the presentation of an SLPD algorithm. Subsequently, the SIRD algorithm is presented with pixels processed in a raster-scan sequence. Comparisons between the conventional view-pipelining architecture and the ray-tracing architectures, in terms of operator numbers, memory requirements, and computation loads are also provided.

There are many possible PE configurations in a multiprocessor system. Two dimensional (2D) CT reconstruction can be further categorized into two processing styles: parallel, and pipeline view processing. The latter is also called view pipelining. Basically, in parallel view processing all the PEs are organized to process the same view, while in view pipelining each PE processes a different view. Hence it is more appropriate to organize the PEs as a linear array for view pipelining and as a mesh-connected array for parallel view processing. These types of processor interconnections facilitate data transfer among the PEs and the host. The PE configuration for parallel view processing is an area of particular focus in this specification.

Figure 6:
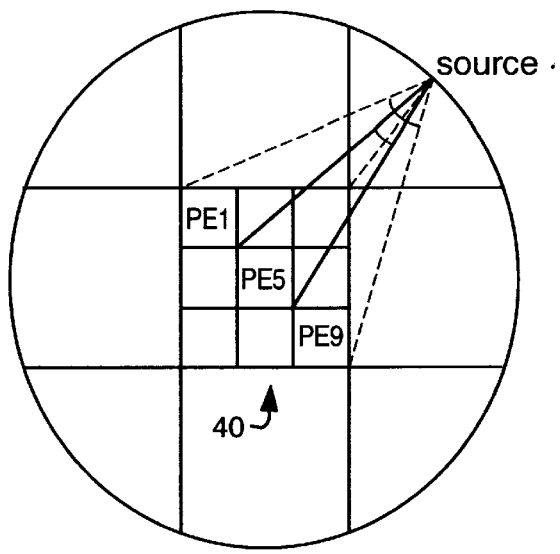
FIG. 6 depicts processing considerations for the system of FIG. 1.

In the view parallel processing system of FIG. 6, the field of view (FOV) is partitioned into nine equal subimage areas 40. Given a whole set of projection (view) data, each PE only has to receive the ray data that are associated with its subimage pixels, which is done in one of two ways: (i) the host (e.g., CPU 16) couples data to a common bus (e.g., VME bus) or through pipeline register by allowing each PE (e.g., interpolator 14) to pick up its relevant data, or (ii) the host only distributes the relevant ray data to each boundary PE and then the boundary PEs redistribute ray data to associated PEs. The former scheme requires no inter-PE communication while requiring some setup time to preload all the projection data. The latter allows the projection data to be transferred during the process of backprojection. To reduce the host loading time in the former case, it is possible to allow more than one PE to pick up ray data from the common data bus, which is done by preloading a unique pair of upper and lower ray numbers to each PE. By comparing the address bus (which carries the current ray number) against the local upper and lower ray numbers, all the relevant PEs simultaneously pick up their own ray data. Thus, it takes only "L" cycles to distribute "L" pairs of ray data to the PEs. For example "L" is 1000 cycles. Because of the preloading scheme used in backprojection, the PEs only have to communicate with the host. This is not true when PEs are also engaged in forward projection and image postprocessing activities. As a generic ray-tracing architecture, the mesh-connected array topology provides a better environment for parallel processing.

Figure 7:
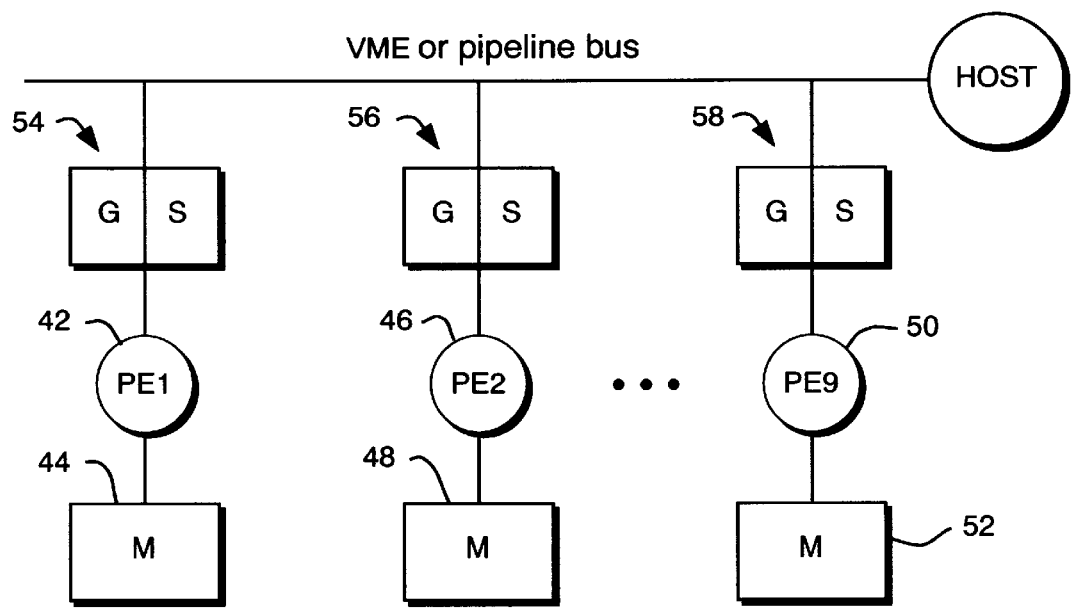
FIG. 7 depicts partitioning and distributing view parallel processing of the system of FIG. 1 into nine PEs.
Figure 8:
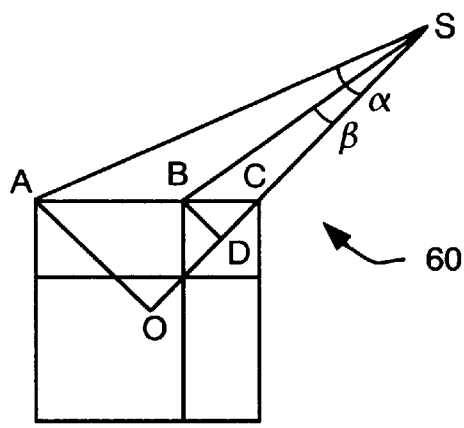
FIG. 8 depicts processing considerations for the system of FIG. 1.

In FIG. 7, each PE 42, 46, 50 has a local image memory (M) 44, 48, 52 and two buffers 54, 56, 58, wherein each G-buffer stores the projection data and each S-buffer stores the ray slopes. The size of the buffers can be determined by the maximum number of projection rays 60 that intersect a subimage area (FIG. 8) where it is assumed that there are "P" processors organized as $P^{1/2}$-by-$P^{1/2}$ array evenly partitioning N-by-N pixels of total image area. Then since $$\overline{BD} = \frac{N}{\sqrt{2P}} \text{ and } \overline{AO} = \frac{N}{\sqrt{2}}, \overline{DS} = \overline{SO} - \frac{N}{\sqrt{2}} + \frac{N}{\sqrt{2P}}, \quad (3)$$

therefore $$\alpha = \tan^{-1}\left(\frac{\overline{AO}}{\overline{SO}}\right) \text{ and} \quad (4)$$

$$\beta = \tan^{-1}\left(\frac{\overline{BD}}{\overline{SD}}\right).$$

Figure 9:
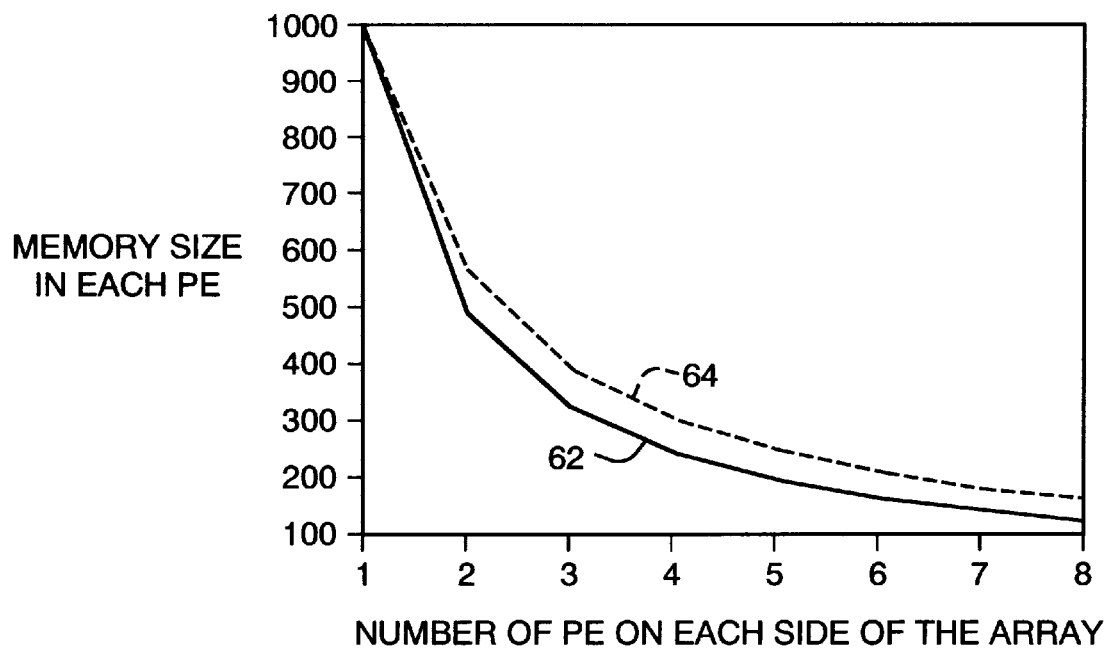
FIG. 9 depicts a reduction in buffer size of the system of FIG. 1 for view parallel processing as the number of processors decrease.

It may therefore be assumed that there are "M" rays in each view covering the FOV. As a consequence, the buffer size may be determined by M β/α. The plot shown in FIG. 9 is obtained by varying $P^{1/2}$ from 1 to 8, while keeping L=1000 rays. The solid line 62 represents the curve of $L/P^{1/2}$, while the dash line 64 indicates the maximum buffer size needed for different $P^{1/2}$s.

Figure 10:
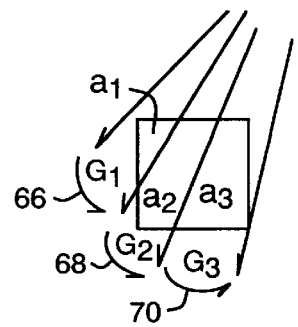
FIG. 10 depicts examples of simplified SIRD processing by the system of FIG. 1, where a pixel is intersected by three rays.

In this section the implementation of the SIRD algorithm in a pixel generation sequence along the ray propagation paths (called SIRD-rp) is described. The SIRD technique shown in FIG. 5 can be further simplified by assuming that the X-ray detectors are butted together. Under this assumption, the X-ray beams (each associated with a detector) are simply divided by lines connecting the source and the joints of the detectors. In other words, each beam is a skim triangle taking the X-ray source and the two-sides of each detector as vertices. Under such circumstance, there is no need to normalize the accumulated pixel values because all the subpixel areas add up to one. The algorithm is further illustrated in FIGS. 10–12, where FIG. 10 shows three beams 66, 68, 70 covering the same pixel. This pixel, as previously illustrated in FIG. 5, may, therefore, be updated from its previous value, $f_{xy}^{(0)}$, to a new value $f_{xy}$ as follows:

$$f_{xy} = f_{xy}^{(0)} + a_1 G_1 + a_2 G_2 + a_3 G_3. \quad (5)$$

However, as the processor traces each ray within the subimage area, there is no prior information as to how many beams eventually intersect each pixel square. The processor may keep the record by adopting a single-bit "E" flag to signal whether or not, for each view, the pixel has been intersected by any beam. For example, in the case of FIG. 11, the pixel has its first intersection defined by a dividing line bordering two adjacent beams associating the ray data, $(G_1, S_{r1})$ and $(G_2, S_{r2})$. The pixel flag "E" is reset to zero after the following update is completed:

$$f_{xy}^{(1)} = f_{xy}^{(0)} + EG_1 + w(G_2 - G_1). \quad (6)$$

Figure 11:
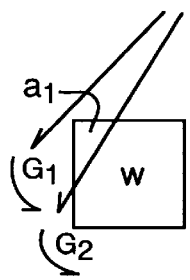
FIG. 11 depicts examples of simplified SIRD processing by the system of FIG. 1, where a pixel is intersected by two rays.
Figure 12:
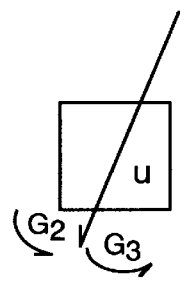
FIG. 12 depicts examples of simplified SIRD processing by the system of FIG. 1, where a pixel is intersected by a single ray.
Figure 13:
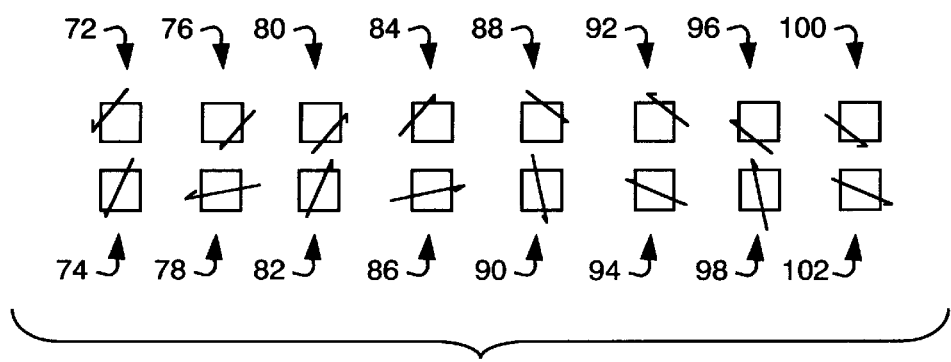
FIG. 13 depicts different ways a ray may intersect a pixel of the system of FIG. 1.

When the non-intersecting line subsequently intersects this pixel, the same operation is performed except that (now "E" being zero) the term of Equation 7 having the E-value may be ignored. The accumulated new pixel value is given as $$f_{xy}^{(2)} = f_{xy}^{(1)} + EG_2 + u(G_3 - G_2) = f_{xy}^{(0)} + a_1 G_1 + a_2 G_2 + a_3 G_3 \quad (7)$$

where, in accordance with FIGS. 11, 12 and 13, $w = a_2 + a_3$ and $u = a_3$.

One of the challenges in realizing the SIRD algorithm is associated with the calculation of subpixel areas intersected by rays having many different combinations of incident angles and slopes. FIG. 13 shows that there are 16 different cases 72, 74, 76, 78, 80, 82, 84, 86, 88, 90, 92, 94, 96, 98, 100, 102 in which a line may cut through a pixel. It is difficult to implement all of the 16 cases in a straightforward manner. In this subsection, a process and apparatus is described for transforming both the entering and exiting points (at which the line intersects with the pixel) so that the variety of line intersection cases reduces from 16 to 2 fundamental cases. As a result, this approach eliminates 21 adders and 14 multipliers, as compared to the full implementation of all 16 cases.

In general, the subpixel area calculation is achieved by the following five steps.

1. Move the origin of the coordinate system to the lower left corner of the associated pixel.

2. Rotate or alternatively flip the pixel square so that the line always intersects (i.e., enters) from the top edge and the exiting point always lies on either the left or the bottom edges of the pixel square (see illustrations 72 and 74 of FIG. 13).

3. Compute the subpixel area to the right-hand side of the line (i.e., facing the direction of the X-ray source).

4. Inversely rotate or alternatively flip the pixel square to its original orientation.

5. Move the origin of the coordinate system back to the lower left corner of the FOV.

Note that after the first step (which is equivalent to a translational transformation), the intersection points associated with the underlying pixel can be represented with only a small number of bits. For example, given an intersection point $(x_1, y_1)$ lying on the right edge of a pixel square, the translation of the new origin is equivalent to subtracting some integer portions of $x_1$ and $y_1$. That is, this intersection can be represented by $(F_{x_1}, F_{y_1})$, where $(F_{x_1})$ maintains the fractional portion of $x_1$ and $(F_{y_1})$ is set to 1. Consequently, the mathematical operations involved in steps 2, 3, and 4 are largely simplified.

The rotation is implemented with a two-stage multiplexor. The flip operation is completed by subtracting the new fractional number from 1.

Figure 14:
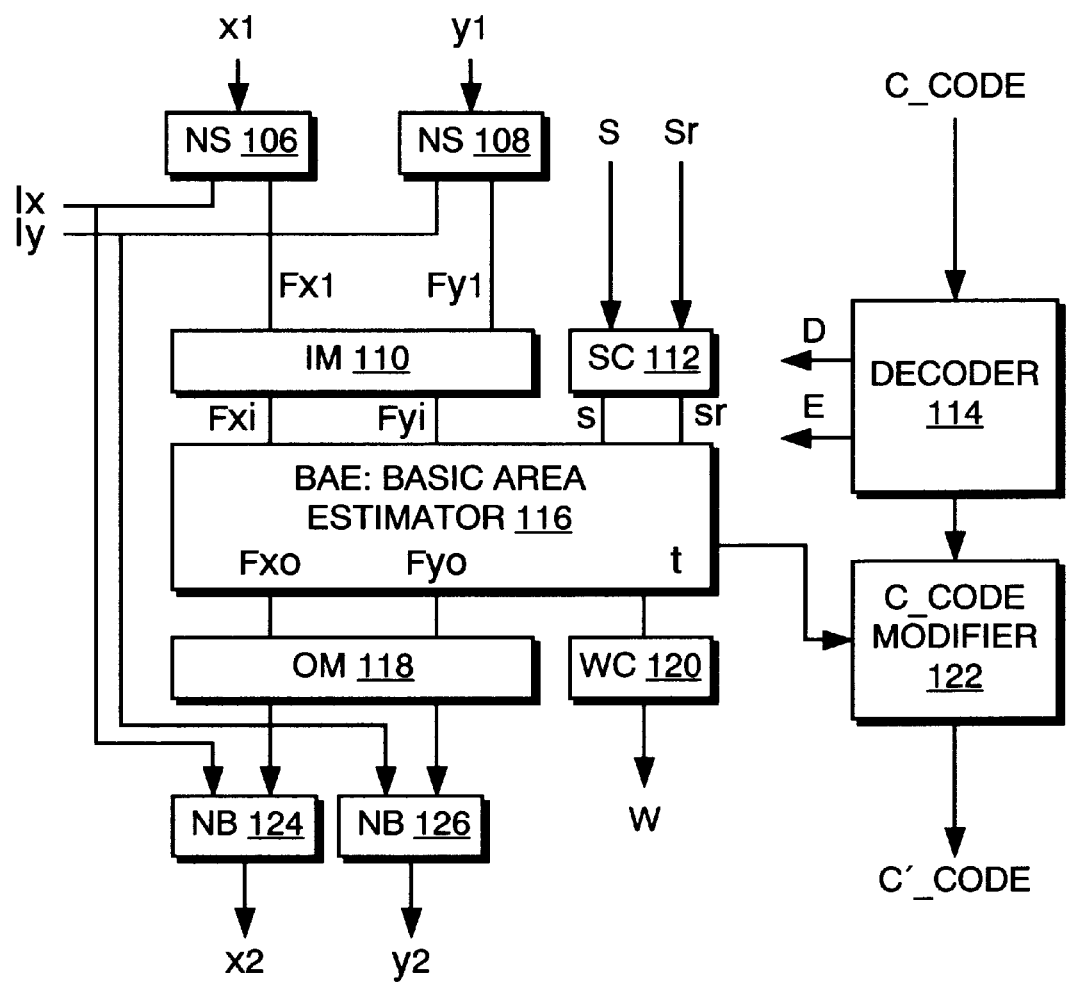
FIG. 14 depicts a sub-pixel area calculator of the system of FIG. 1.
Figure 15:
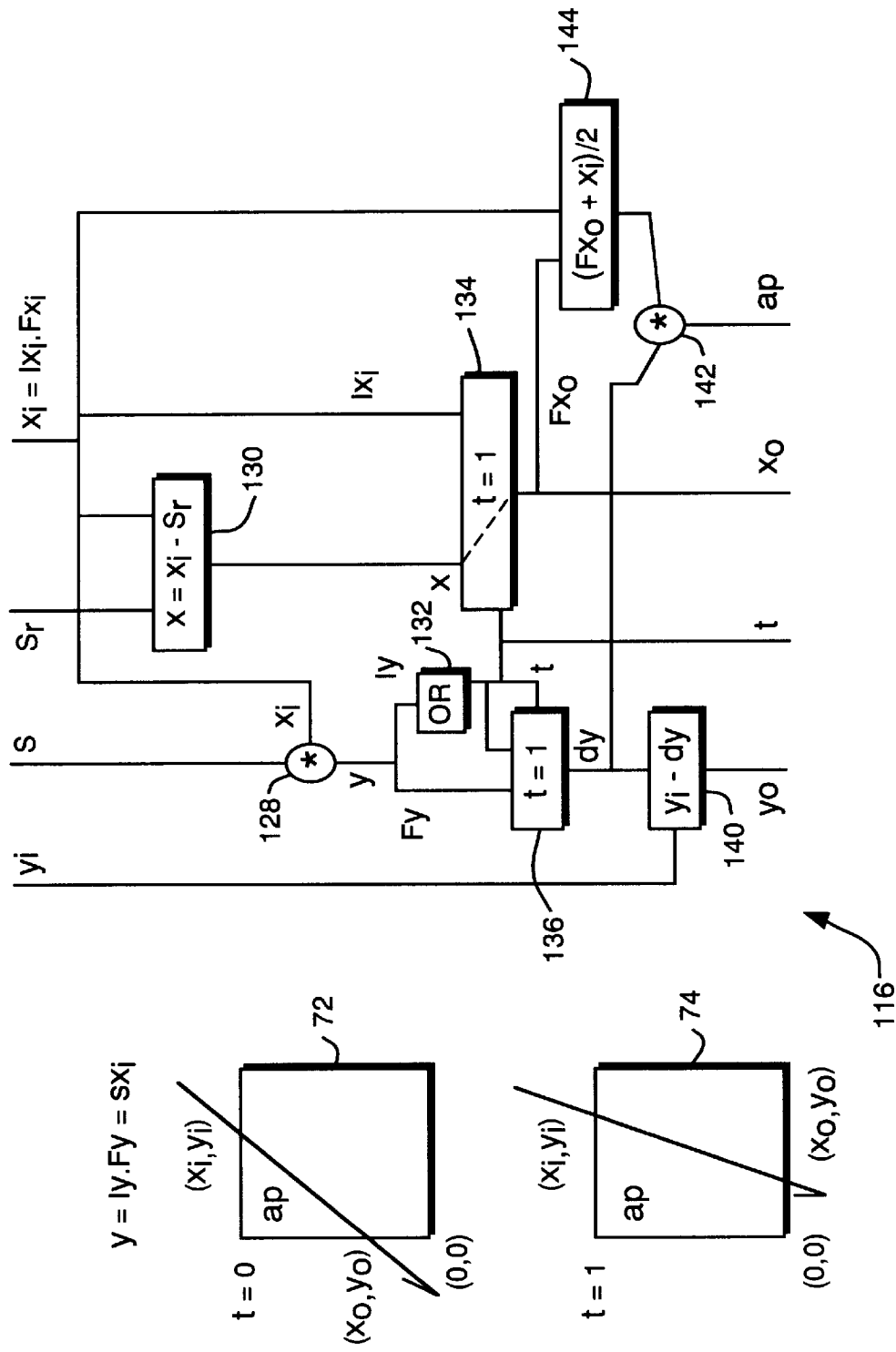
FIG. 15 depicts a basic area calculator of the system of FIG. 1.
Figure 16:
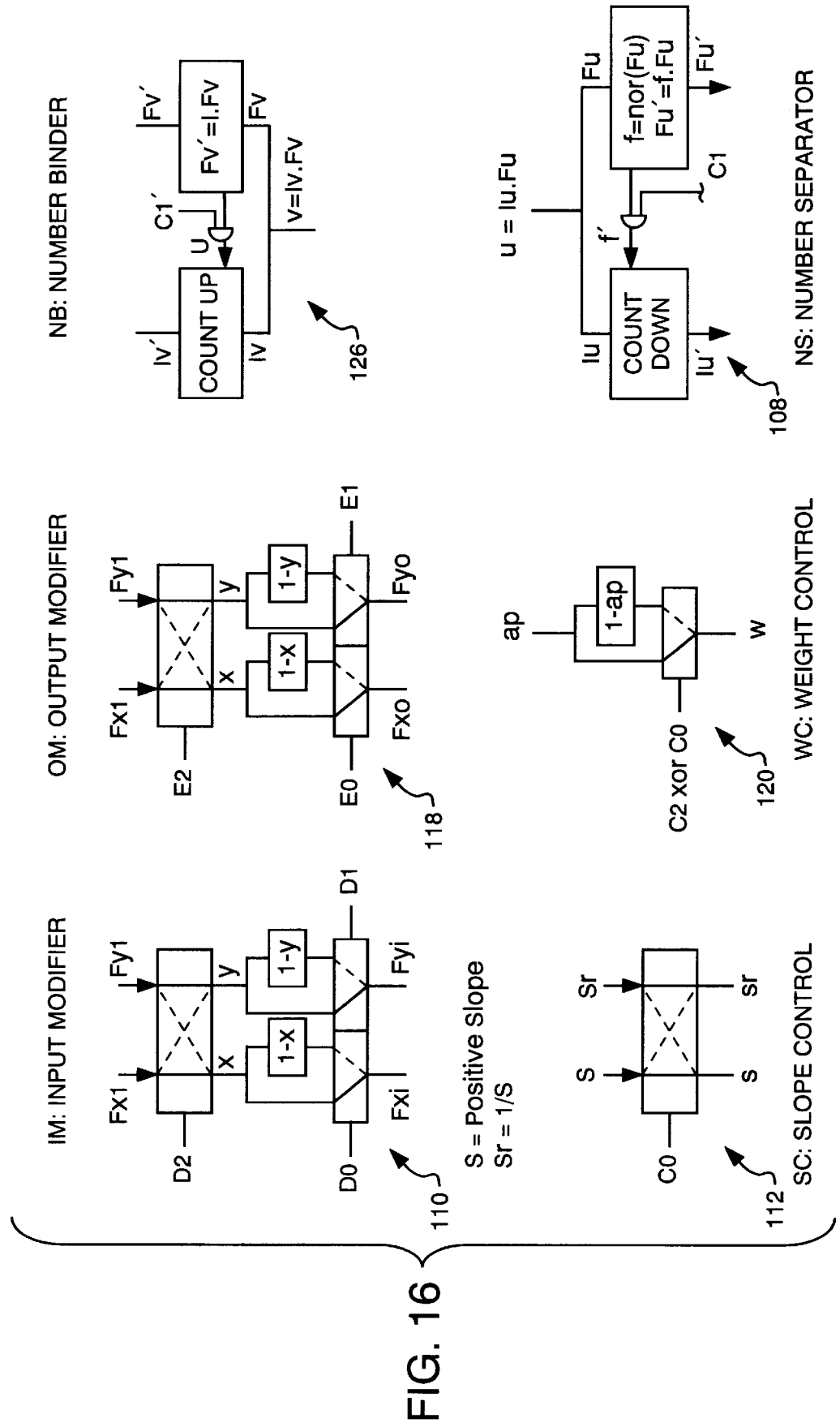
FIG. 16 depicts examples of implementations of the modules of FIG. 14.
Figure 17:
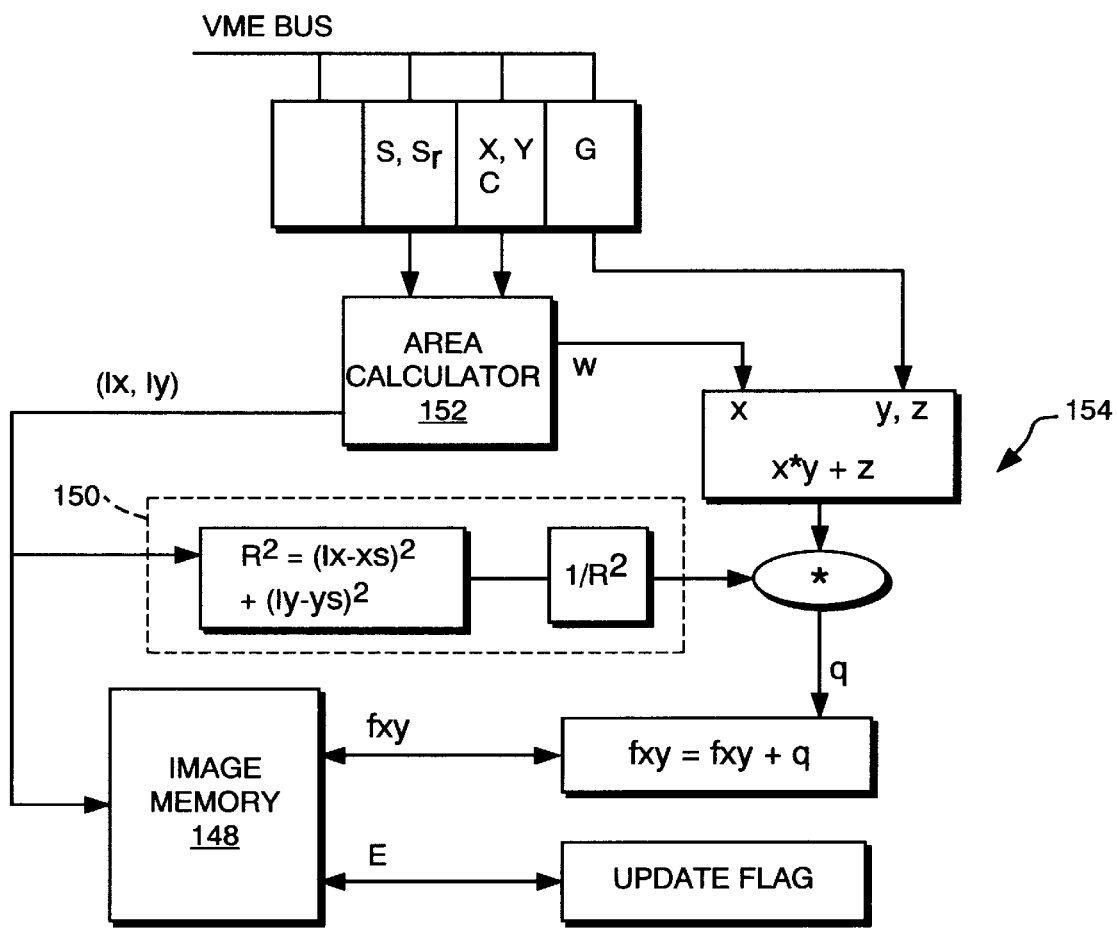
FIG. 17 is a block diagram of a strip-integral processor element of the system of FIG. 1.

FIG. 14 shows a block diagram of the pixel area calculator (PAC) 104 and FIG. 15 shows the basic area estimator (BAE) 116. The BAE 116, being the most central part of the PAC 104 (FIG. 14) computes the subpixel area of the two fundamental cases 72 and 74 as identified in FIG. 13. It consists of one multiplier 128, three (six bit) adders 130, 134, 144 and other associated circuits, such as multiplexers and logic gates 132, 136, 140, 142. The above five steps correspond, one to one, with operations that may be performed in a respective box of the five boxes 106, 110, 116, 118, 126 in FIG. 14. The five boxes are designated as NS (number separator) 106, IM (input modifier) 110, BAE 116, OM (output modifier) 118, and NB (number binder) 126. FIG. 16 is used to illustrate details of these modules, together with WC (the weight converter) 120 and SC (the slope converter) 112. The functional block diagram of a SIRD processor element 146 at the backprojector level is shown in FIG. 17, where "E" is a single-bit flag, one for each pixel, which is simultaneously accessed from the image memory 148. The left corner coordinates of the underlying pixel, designated as (lx, ly), is linked as an address to the image memory 148. There are three buffers, each 32 bits wide, supporting the ray-tracing computations and pixel accumulations (Equations 1, 2, and 6).

A process for implementing the $R^{-2}$ function is described next. In the block diagram of FIG. 17, there are three computational functions at the PE level, namely, the sub-pixel area calculator 152, $R^{-2}$ function 150, and the operational blocks 154 involving interpolation and update of the image pixels, where "R" is the distance between the x-ray source and the underlying pixel (lx, ly). Since "R" changes from pixel to pixel, the CPD pipeline approach uses a circuit consisting of three 12-bit adders, two 16×16 multipliers, and a 4K×16 bit SRAM to implement the $R^{-2}$ function. Such an approach, especially the SRAM, is relatively expensive in either single chip or multichip-module implementations. The $R^{-2}$ function is approximated with a truncated series expansion based on precomputed reference $R_a^{-2}$.

Figure 18:
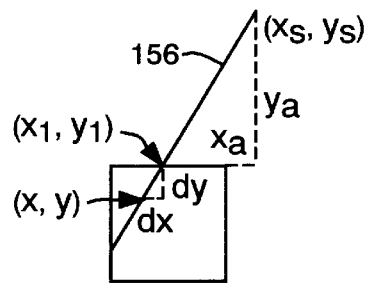
FIG. 18 depicts processing considerations of the system of FIG. 1.

The present invention simplifies block 150 in FIG. 17. Coordinates (lx, ly) identify the position of the current pixel in rectangular coordinates and (xs, ys) is the position of the x-ray source. It is assumed that $R_a$ is accurately computed. $R_a$ (FIG. 18) is the distance 156 between a reference point $(x_1, y_1)$ and the x-ray source. The goal is to express any new "R" (for pixels lying in the square) in terms of $R_a$ and some accumulated values. The approximation consists of the following two steps:

1. $R^2$ is updated by expressing it in terms of $R_a^2$ and $dR^2$, and is derived as follows:

$$R_a^2 = (x_1 - x_3)^2 + (y_1 - y_3)^2 = x_a^2 + a^2$$

$$R_a^2 = (x - x_3)^2 + (y - y_3)^2 = (x_a + dx)^2 + (y_a + dy)^2$$

$$R_a^2 + 2x_a dx + 2y_a dy + dx^2 + dy^2$$

$$R_a^2 + dR^2 \qquad (8)$$

Now let x'=x+a and y'=y+b. Then $$R'^2 = (x' - x_3)^2 + (y' - y_3)^2 = R_a^2 + dR'^2$$

$$dR'^2 = dR^2 + 2a(dx + x_a + a) + 2b(dy + y_a + b) - a^2 - b^2 \qquad (9)$$

Figure 19:
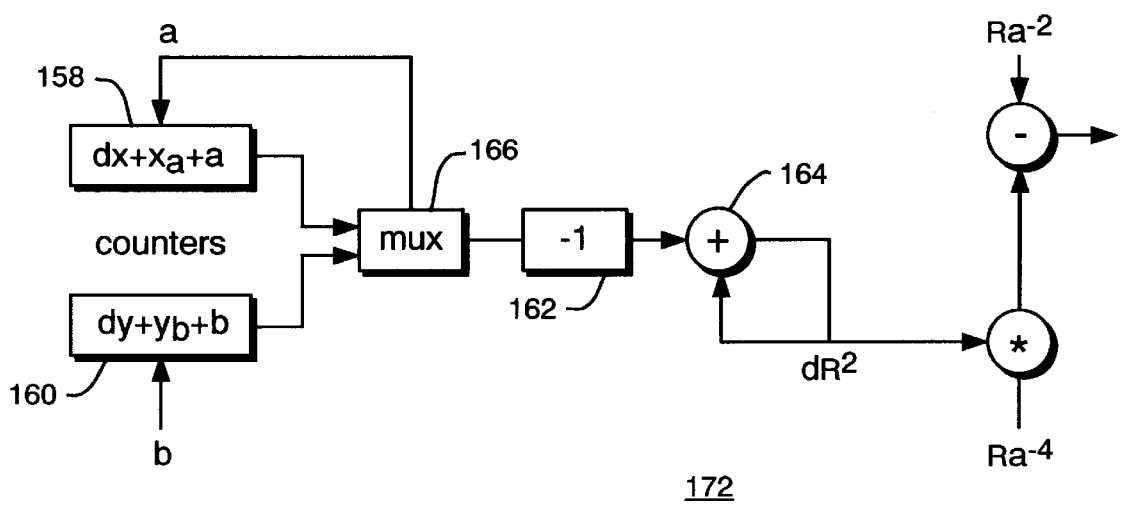
FIG. 19 depicts an example of an implementation of the $R^{-2}$ function with approximation of the system of FIG. 1.

In accordance with the ray-tracing sequence, "a" and "b" are either 1 or 0, but not both. As a consequence, the update of $dR'^2$ in Equation 9 becomes simple. FIG. 19 shows that it only requires three counters 158, 160, 162, one adder 164, and one multiplexer 166 to recursively keep track of $dR'^2$.

2. $R^{-2}$ may be evaluated by using truncated series expansion. Since $$(1+x)^{-1} = 1 - x + x^2 - x^3 + \ldots \; R^{-2} = (R^2)^{-1} = (R_a^2 + dR^2)^{-1} = R_a^{-2} - dR^2 R_a^{-4} + dR^4 R_a^{-6} - \qquad (10)$$

Figure 20:
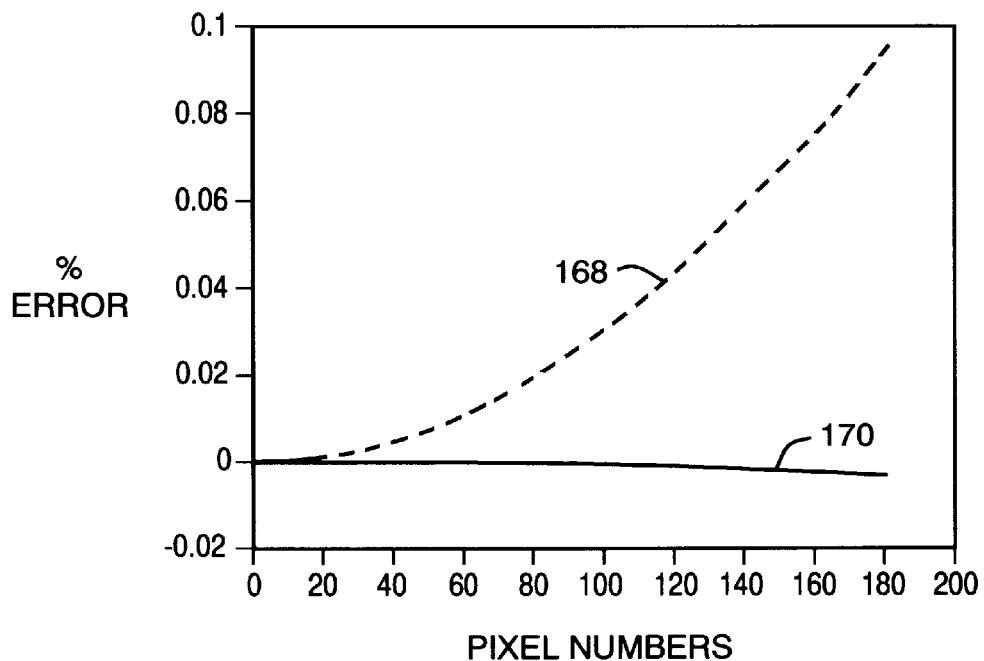
FIG. 20 depicts percentage error of the approximated $R^{-2}$ function of the system of FIG. 1.
Figure 21:
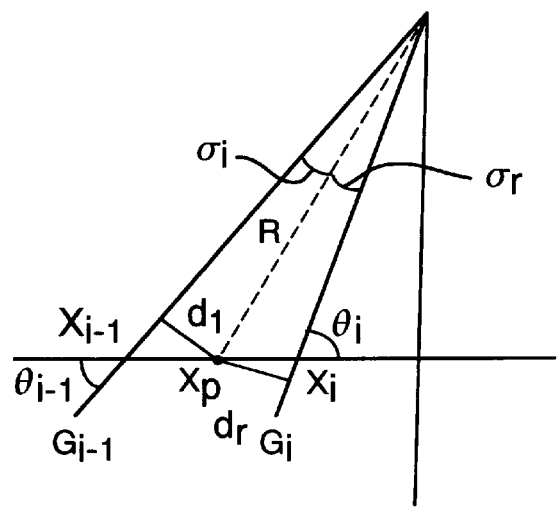
FIG. 21 depicts an example of the distance between a pixel and its associated left and right rays of the system of FIG. 1.

In the plot shown in FIG. 20, the percentage error of this approximation is less than the reconstruction error due to noise and artifacts (on the order of about 0.1%). In the example shown, $dR/R_a$ was chosen to be less than 10% and the reference point $R_a$ was assumed to be located at the center of the square. The dash and solid lines 168, 170 correspond to preserving two and three terms of the series expansion in equation 10, respectively. A circuit 172 implementing the approximated $R^{-2}$ function by preserving only two terms is illustrated in FIG. 19.

Alternatively, the $1/R^{-2}$ function may be implemented in a lookup table. The lookup table resides in memory and is entered using appropriate values of "a" and "b" variables shown in equation 9.

A scan-line approach is presented next. This section deals with the implementation of an SCPD algorithm implementing the ray-tracing concept. As previously discussed, it is relatively straightforward to compute the length or strip area when a ray encounters a unit square, once its entering and exiting points are known. For the case of a pixel-driven algorithm, each pixel is a grid-point sandwiched by a number of adjacent rays. A linear interpolator is used to determine the weight of the contribution of the two nearest rays. The left ray shall be denoted as $L_l$, the right ray as $L_r$, and the pixel in between as P(x, y). Also, let $L_p$ be the line connecting the source and P(x,y). In the CPD method, the angles $\theta_l$ and $\theta_r$, (representing the respective angle between the line pairs $(L_l,L_p)$ and $(L_p,L_r)$) are obtained first. The image intensity, $f_{x,y}$ at P(x,y) is updated as $$f(x, y)^{(1)} = f(x, y)^{(0)} + \frac{(G_l \theta_r + G_r \theta_l)}{R^2} \qquad (11)$$

where "R" is the distance between the x-ray source and P(x, y); $G_l$ and $G_r$ are projection values associated with $L_l$ and $L_r$, respectively.

To avoid the use of an arc-tangent function in the evaluation of angles $\theta_l$ and $\theta_r$, the angle calculation is replaced by determining the distances from P(x, y) to $L_l$ and $L_r$. The sin of $\theta_l$ and $\theta_r$ is determined by $$\sin\theta_l = \frac{d_l}{R} \text{ and } \sin\theta_r = \frac{d_r}{R}. \qquad (12)$$

Since both $\theta_l$ and $\theta_r$ are small (less than about 10 degrees respectively), the above relationship can be approximated as $$\theta_l \approx \frac{d_l}{R}, \theta_r \approx \frac{d_r}{R}, \text{ and } d_l + d_r \approx R(\theta_l + \theta_r) \qquad (13)$$

Given the approximation above, equation 11 can be written as $$f(x, y)^{(1)} = f(x, y)^{(0)} + \frac{(G_l d_r + G_r d_l)}{R^3} \qquad (14)$$

The SLPD computation steps are summarized below:

1. For each view (snapshot), obtain the location of the x-ray source $(x_o, y_o)$ and for each ray compute its reciprocal slope $s_r$ and $\sin(\theta)$, where $\theta$ is the angle between the ray and the horizontal line in the image plane.

2. For each horizontal (pixel) line segment within the FOV, at $y=y_q$, the intersection points $x_i$ is determined by computing the following:

$$x_i = x_a + s_r(y_q - y_o). \qquad (15)$$

3. Scan across the horizontal line segment and obtain a pair of nearest intersection points $(x_{i-1}, x_i)$ for each pixel $(x_p, y_q)$ such that $x_{i-1} < x_p < x_i$.

4. Compute the distances from the pixel $(x_p, y_q)$ to the left and right rays according to the following trigonometric relationship:

$$d_l = (x_p - x_{i-1})\sin(\theta_{i-1})$$

$$d_r = (x_i - x_p)\sin(\theta_i). \qquad (16)$$

5. Update the pixel's image value as follows:

$$f(x_p, y_q)^{(1)} = f(x_p, y_q)^{(0)} + \frac{(d_r G_{i-1} + d_l G_i)}{(d_r + d_l)R^2} \quad (17)$$

$$= f(x_p, y_q)^{(0)} + \frac{(d_r G_{i-1} + d_l G_i)}{cR^3},$$

where $G_{i-1}$ and $G_i$ are two detector values associated with the left and right rays and "c" is a constant equal to $\theta_l + \theta_r$.

Note that, step 1 is completed in the host, while steps 2 to 5 are accomplished in each PE. Moreover, in order to avoid using the lookup table for the $R^{-3}$ function, one may also approximate this function with truncated series expansion as follows:

$$R^{-3} = (R^2)^{-3/2} = (R_a^2 + dR^2)^{-3/2} = R_a^{-3} - 3/2 dR^2 R_a^{-5} + 15/8 dR^4 R_a^{-7} - \ldots, \quad (18)$$

where the updating circuit for $dR^2$ is circuit 172 (FIG. 19).

Figure 22:
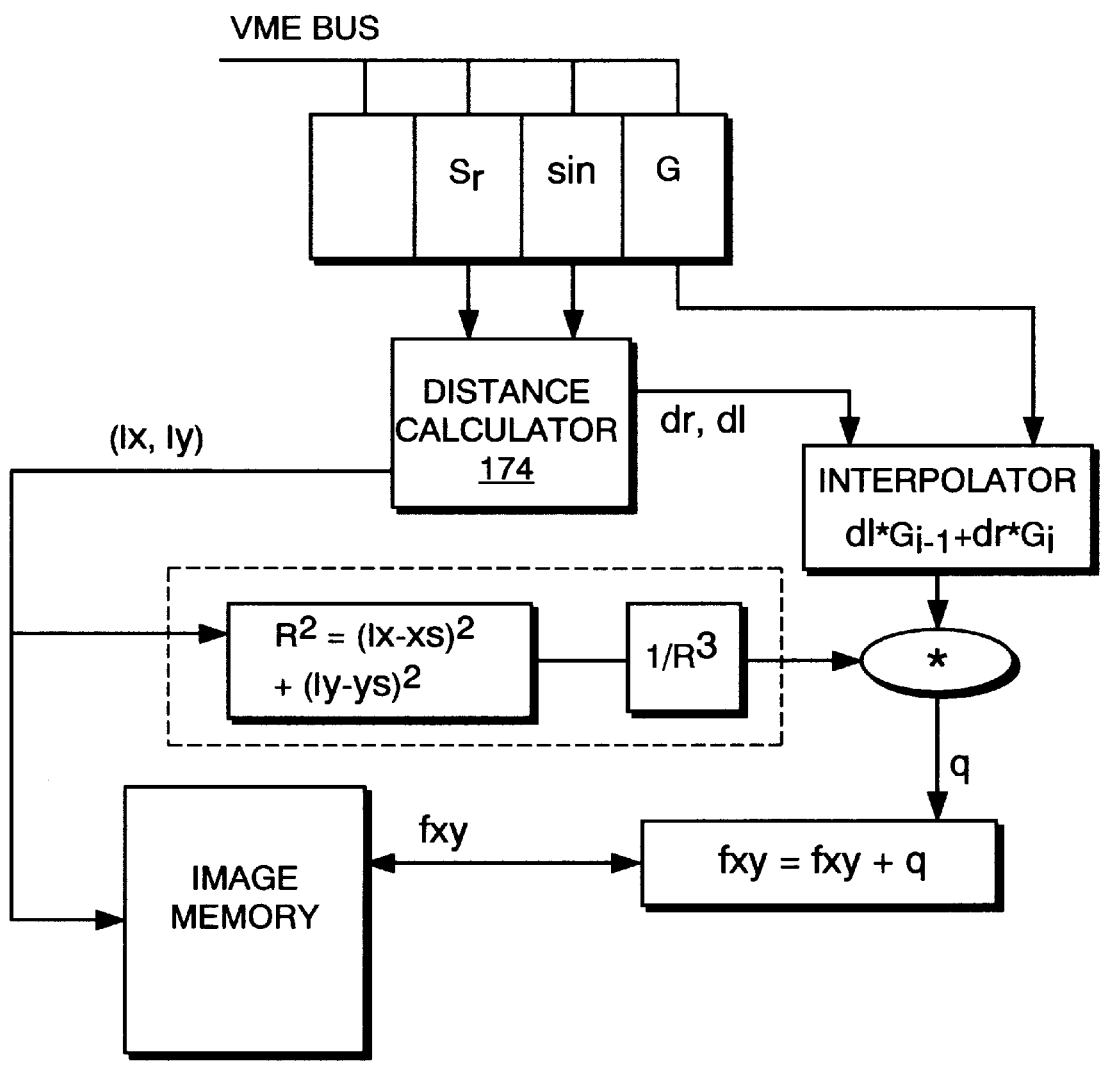
FIG. 22 depicts a block diagram of the scan-line architecture of the system of FIG. 1.

FIG. 22 depicts apparatus 172 for performing the SLPD method at the processor level. Note also that the size of the three memory banks, now holding the detector value "G", the sinusoidal $\sin(\theta)$ value, and the reciprocal slope value $S_r$, is determined by the same criteria described above.

It should also be noted from a comparison of FIGS. 17 and 22 that the processes of SLPD and SIRD can be implemented using generic architecture. One difference is that SLPD needs a "distance calculator" 174, while SIRD needs an "area calculator" 152.

An alternative architecture is described next for implementing SIRD in a raster-scan sequence (hereafter identified as SIRD-raster sequence). The need for a raster scan is based on the conventional view pipelining approach—that is, instead of tracing through the pixels along the X-ray paths, trace image pixels by scanning along the horizontal (or vertical) lines. By so doing, a number of backprojection modules are lined up as pipeline processors, each handling the reconstruction of the same pixel from a different view of projection data. The major steps of the SIRD-raster sequence include: (1) formulation of a lookup table containing two to three precomputed subareas at each location, (2) the reduction of $N^2$ single-bit flags to three single-bit flags, and (3) a correspondent backprojection architecture pipelining the pixels and the projection data so that any number of backprojection modules can be used in the system.

Figure 23:
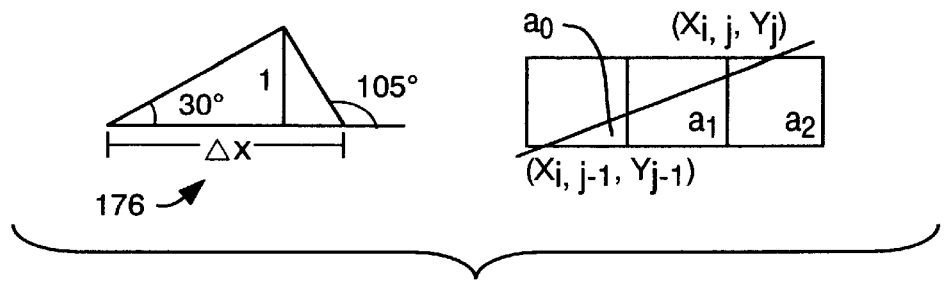
FIG. 23 depicts processing considerations of the system of FIG. 1.

It is desirable to find the subpixel areas intersected by the ray when the ray intersects several pixels in the same row (horizontal line). When rays intersect the pixel from all directions, it is very inefficient to design an algorithm to compute all possible intersections. It is also inaccurate to represent the inverse slope ($S_r$) of each ray with a fixed point number (typically 16 bits). An alternative approach is to make use of the property of octant symmetry so that one only need be concerned with the view angles lying in the range of 45 to 90 degrees, which ensures that the magnitude of $S_r$ will always be smaller than 1. Additional information regarding the typical fan-beam angle (30 degrees, for example) helps to further confine the intersecting angles located between the rays and the horizontal line to between 30 and 105 degrees. Consequently, no ray will intersect more than three pixels in a row and also allows the possibility of formulating a lookup table of the subpixel areas of up to three pixels. In fact, assuming that each edge of the pixel is presented by "k" binary bits, then the size of the lookup table is $2^{2k}\Delta x$, where $\Delta x$ is obtained from the bottom edge of the triangle 176 shown in FIG. 23.

Figure 24:
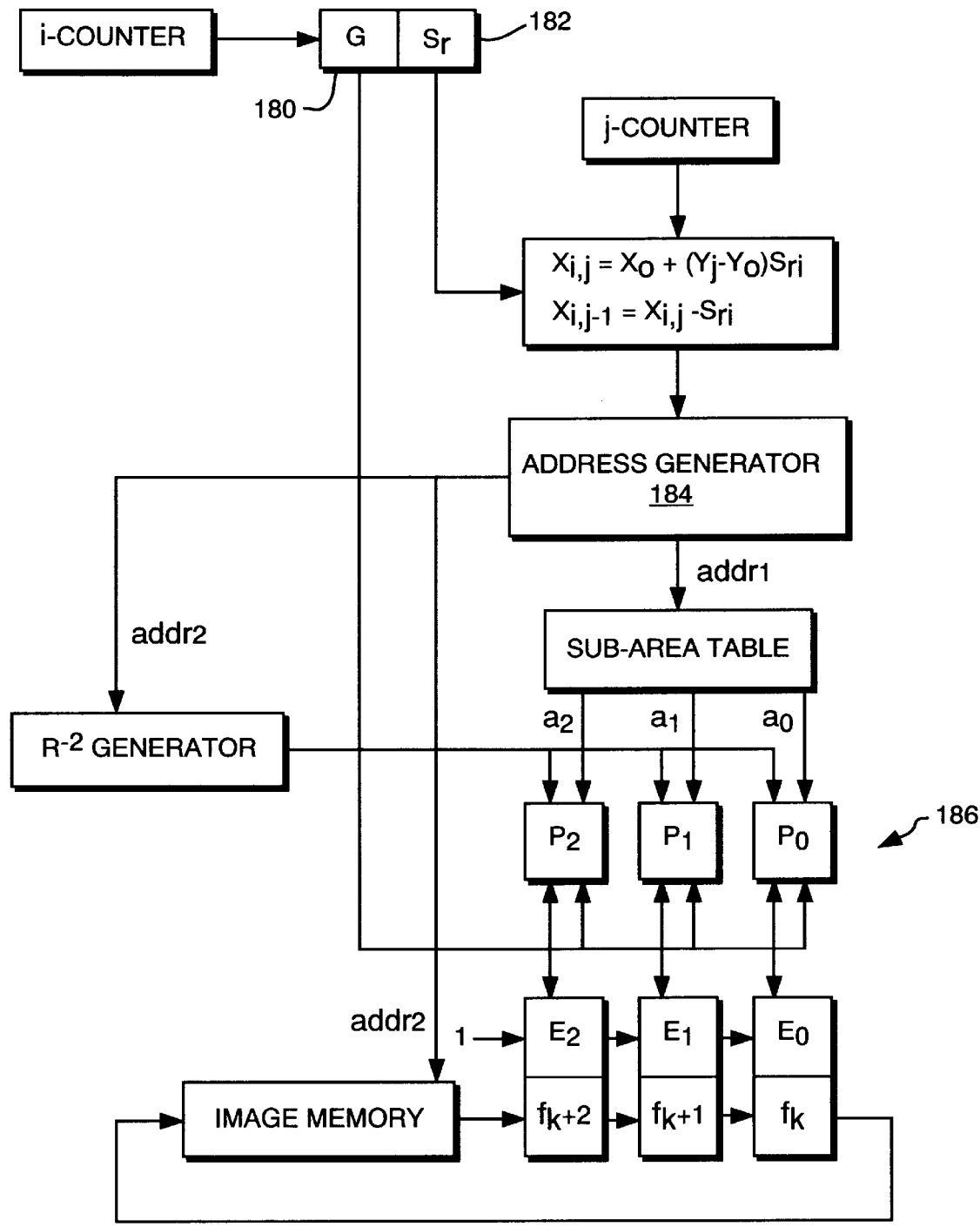
FIG. 24 depicts a block diagram of the SIRD processor architecture for raster scanning of the system of FIG. 1.

FIG. 24 shows the block diagram of the backprojection module 178, where the size of the projection data buffer, "G" 180 and the inverse slope buffer, $S_r$ 182 is determined by the number of pixels in each scanning line. During each count, two intersection points ($x_{i,j}$ and $x_{i,j-1}$) across the top and bottom edges of the pixel row are computed. An address generator 184 computes addr1 for addressing the subarea table and addr2 for addressing the image memory.

Let $S_{ri}$ be the inverse slope of the i-th ray such that $x_{i,j} - x_{i,j-1} = S_{ri}$. Also let fx be the fractional portion of $x_{i,j}$. Then addr1=$2^k(3fx+S_{ri}+1)-1$, where "k" is the number of binary bits specifying the subpixel resolution. The three subpixel areas ($a_0$, $a_1$, $a_2$) are simultaneously loaded into three image interpolators 186. Whenever the interpolator $P_n$ (for n=0, 1 and 2) is activated, the following instructions are executed:

$$f_{k+n}^{(1)} = f_{k+n}^{(0)} + (E_n G_{i-1} + a_n(G_i - G_{i-1}))R^2 \quad (19)$$

$$E_n = 0,$$

where $f_{k+n}$ are image pixels sequentially accessed from the image memory according to addr2. The right-shift register arrays are used to hold the three most recent pixels accessed from the image memory and their updated "E" flags. Whenever a new image pixel is written into $f_{k+2}$, its corresponding flag $E_2$ is set to one. With this scheme, the single-bit "E" flags are reduced from $N^2$, the total pixel number, to three flags.

Both FIGS. 17 and 24 are associated with SIRD processing. The former (FIG. 17) however, traces the pixels along each ray, while the later (FIG. 24) traces pixels along each horizontal line. The later is somewhat similar to CPD and SLPD.

Figure 25:
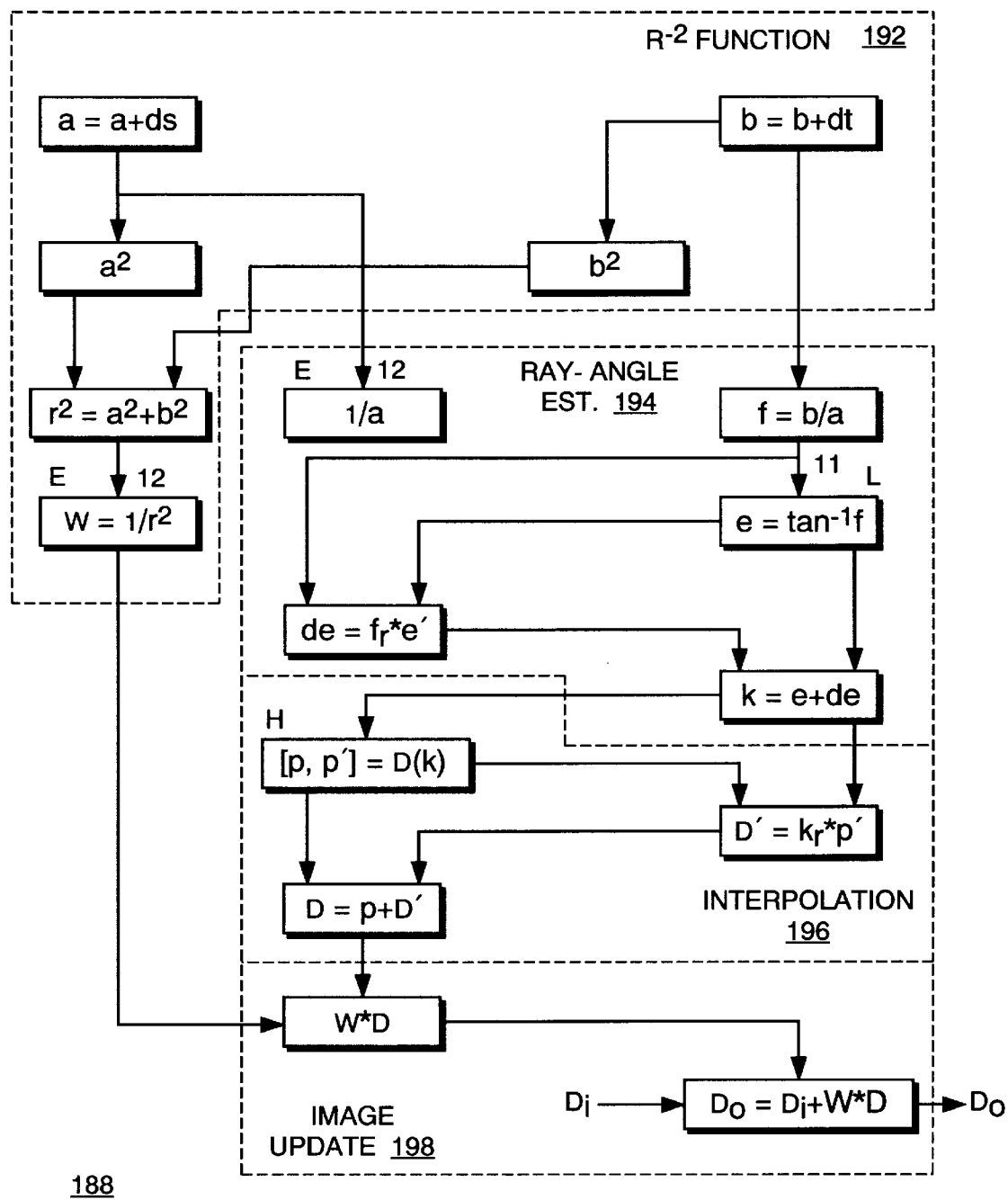
FIG. 25 depicts a block diagram of a conventional view pipelining backprojection module of the system of FIG. 1.
Figure 29:
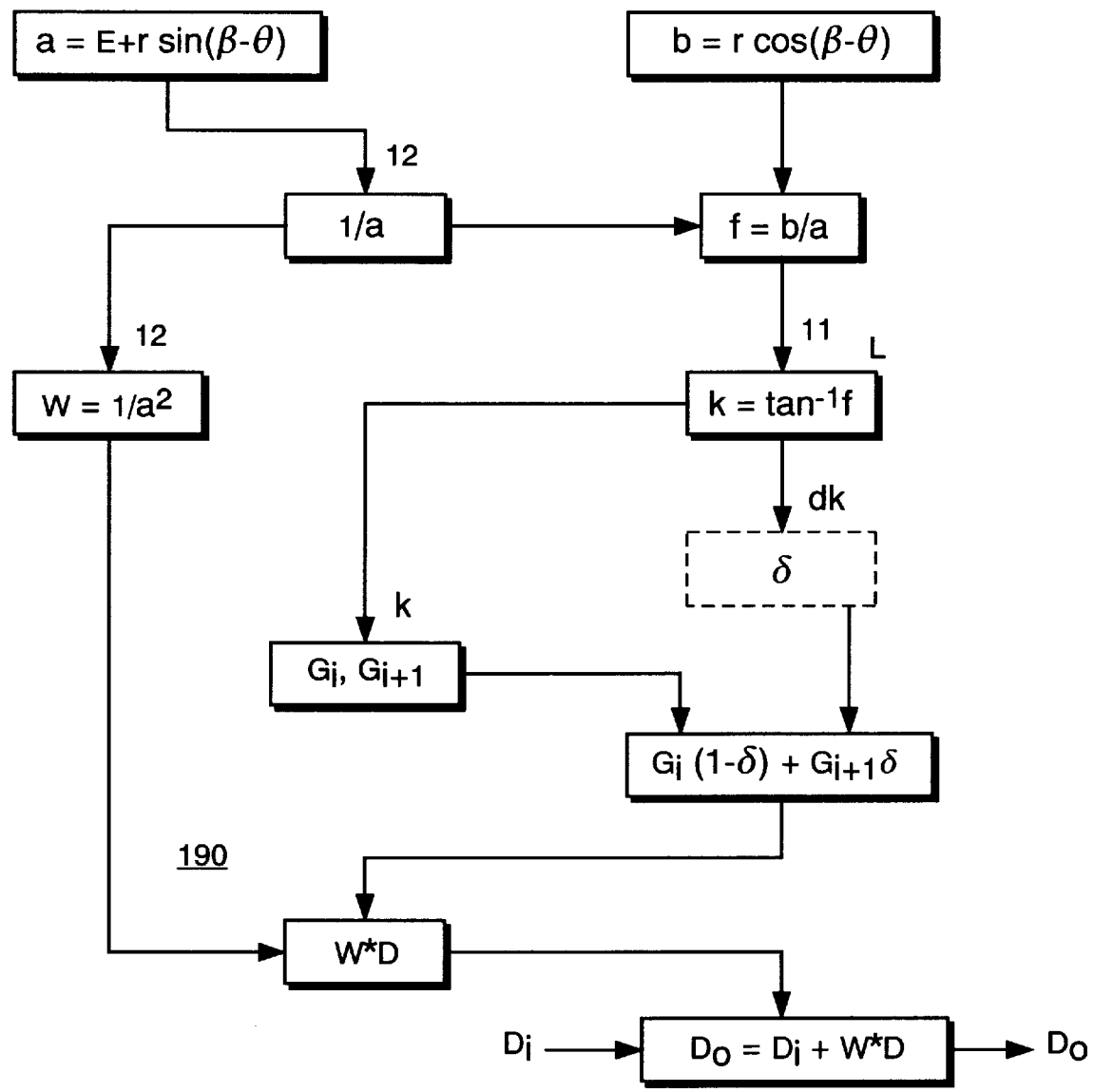
FIG. 29 depicts a pixel-driven architecture of the system of FIG. 1.

A comparison of the three described pipeline architectures is presented next. In order to evaluate the hardware complexity of the above three ray-tracing architectures, the conventional view pipelining architecture is used as a reference. A backprojection module 188 is a 14-stage pipeline architecture (FIG. 25) suitable when multiple modules are used in the system. FIG. 25 is a detailed view pipelining architecture implementing the previously described CPD methods. FIG. 29 is a simplified version of FIG. 25.

For parallel view processing, the CPD approach, in general, has hardware redundancy because of the ways it implements the $R^{-2}$ and arc-tangent functions. Three criteria are used (i.e., hardware complexity, ASIC chip complexity, and computation time) to evaluate the cost-effectiveness of each architecture.

Hardware complexity is described first. The hardware complexity is expressed in terms of the number of operators and the memory size in a multi-backprojector system. In order to compare at equivalent levels of processing accuracy, the backprojection module 188 is partitioned into four subsystems: weighting functions (i.e., $R^{-2}$, $R^{-3}$ or the reciprocal tables) 192, ray angle estimation 194, interpolation 196, and pixel updating 198. It is assumed that each subsystem requires the same number of bits. The following Table I summarizes the number of operators required in each subsystem, where "A" and "M" stand for the adders and multipliers, respectively; (.)* denotes the option of maintaining three (instead of two) terms in the truncated series expansion for $R^{-2}$ or $R^{-3}$.

TABLE 1

Number of operations required in four different backprojection modules

| No. of operators | $R^{-2}$ or $R^{-3}$ functions | Ray Angle Est. | Inter-polation | Image update | Total |
|---|---|---|---|---|---|
| CPD | 3A, 2M | 1A, 2M | 1A, 1M | 1A, 1M | 6A, 6M |
| SIRD-rp | 2A, 1M (3A, 3M)* | 3A, 1M | 1A, 1M | 1A, 1M | 7A, 4M (8A, 6M)* |
| SLPD | 2A, 1M (3A, 3M)* | 5A, 3M | 1A, 2M | 1A, 1M | 7A, 6M (8A, 8M)* |
| SIRD-raster | 2A, 1M (3A, 3M)* | 12A, 4M | | | 14A, 5M (15A, 7M) |

To estimate the memory requirement, let "L" be the size of projection data in each prefiltered view, "V" be the number of views in each scan, and "N" be the image size on each side of the FOV. The following Table II summarizes the memory requirement for four different implementations (each consisting of "P" backprojection modules).

TABLE 2

The memory size in four different backprojection modules

| Memory Requirement | Lookup tables/Buffer (per module) | Total (bytes) (P modules) |
|---|---|---|
| CPD | Reciprocal: 2 × 4k 16 bits<br>Projection data: $\frac{L}{P^{\frac{1}{2}}} \times 32$ bits | $4N^2 + \$LP^{1/2} + P\,24k$ |
| SIRD-rp | Buffers: $3 \times \frac{L}{P^{\frac{1}{2}}} \times 32$ bits | $4N^2 + 12LP^{1/2}$ |
| SLPD | Buffers: $3 \times \frac{L}{P^{\frac{1}{2}}} \times 16$ bits | $4N^2 + 6LP^{1/2}$ |
| SIRD-raster | Buffers: $2 \times \frac{L}{P^{\frac{1}{2}}} \times 16$ bits<br>sub-pixel area table: 256 bytes | $4N^2 + 4LP^{1/2} + 256P$ |

The chip complexity is used as another criterion for comparison of cost effectiveness. Issues such as I/O pin count and package size are important factors in determining the chip area. The chip area is dominated by the size of the SRAM buffers, rather than by the number of functional operators. The transistor count of the functional operators in the four described backprojectors typically varies from 100K to 120K, while 8K bytes of SRAM requires typically 390K transistors. The number of backprojection modules sharing the same view data and the ratio of ROM-to-SRAM used in the CPD approach are factors in the layout of the chip area. Since both the SIRD and SLPD methods have additional buffers, it would not be appropriate to simply compare them with only one processor in the system. Therefore, the SIRD-raster method is compared with the three CPD options (each with different SRAM and ROM configurations). The processor number, "P", is assumed to be one and the size of the projection data in each view is assumed to be 1024. From the following Table III, it can be seen that the SIRD-raster scan method has the lowest pin count without the use of external buffers.

TABLE 3

The chip complexity of CPD and SIRD-raster scan methods

| Chip Complexity | Transistor count | Estimated area (0.8µ) | I/O signal pin count |
|---|---|---|---|
| CPD-I<br>3 tables in ROM | Operators: 100K<br>RCM: 192K | 320 × 320 mil² | 107<br>(1 external buffer) |
| CPD-II<br>1 table in ROM | Operators: 90K<br>ROM: 390K | 410 × 410 mil² | 163<br>(3 external buffers) |
| CPD-III | Operators: 100K | 330 × 330 mil²<br>(I/O pin bounded) | 206<br>(4 external buffers) |
| SIRD-raster<br>32-bit SRAM | Operators: 120K<br>SRAM: 192K | 330 × 330 mil² | 96<br>(no external buffer) |

Computation speed may also be considered. Assume that the system clock for all the four backprojectors is the same. Then the image reconstruction speed using ray-driven algorithms is based on the averaged ray density, "D", defined as $$D = \frac{\text{No. of rays along the closer FOV edge relative to } X - \text{ray source}}{\text{No. of pixels along the closer FOV edge relative to } X - \text{ray source}}. \quad (20)$$

In most cases this ratio is greater than one, which implies that the CPD has greater speed advantage over the SIRD-rp and SLPD schemes. On the other hand, since the SIRD-raster scheme has as many as three pixels updated in each clock, it may suggest that the SIRD-raster scheme is about two to three times faster than the SIRD-rp and SLPD methods. Because the practical ray density "D" is about 1.5 to 2, the computation speed is about equal in both CPD and SIRD-raster scan methods.

Next the modeling of pixels as circular discs is described. The use of round pixels allows SIRD to be implemented on a common platform 200 with CPD, such as that shown in FIG. 30.

Figure 26:
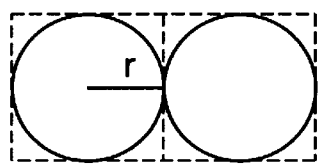
FIG. 26 depicts an example of abutting rounded disks of the system of FIG. 1.
Figure 27:
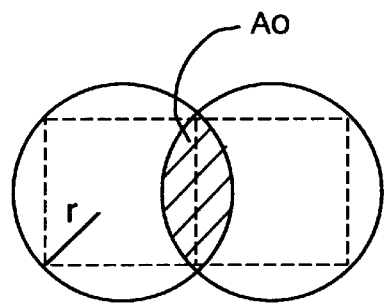
FIG. 27 depicts an example of overlapping rounded disks of the system of FIG. 1.
Figure 28:
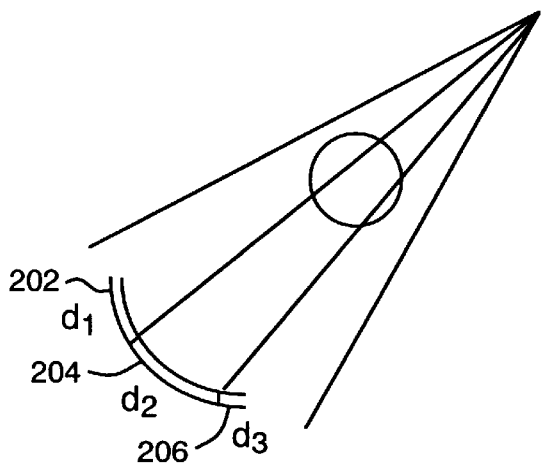
FIG. 28 depicts an example of a pixel projected onto three detectors of the system of FIG. 1.

The pixel shape in all the previous reconstruction techniques has been assumed to be either a unit square (for the strip-integral ray-driven algorithms) or a rectangular grid (for the pixel-driven algorithm). Next, it is assumed that the pixels are overlapping round discs with a parametized radius "r" (where "r" is normally larger than ½ of the diameter of the circle or 0.5). Under this condition, the conventional pixel-driven method is modified to operate like a ray-driven algorithm by associating, during the interpolation process, more than two nearest rays to each pixel. The overlapped area $A_o$ between any two adjacent pixels is uniquely determined by "r" (see FIGS. 26, 27). FIG. 28 illustrates a round pixel projecting onto three detectors 202, 204, 206.

The interpolation weights are determined by the subareas of the rays intercepting the underlying pixel. Conceptually this is a strip-integral ray-driven scheme, except that it is implemented in a modified PD architecture identified as an improved ray-driven method (IRD). The calculation of the interpolation weights is described below.

Assume that all the rays of each projection view are indexed sequentially from left to right. The implementation of IRD may be characterized by the following three steps:

1. Find the index of a virtual ray passing through the center of the underlying pixel. To this end, one may use the same procedure adopted in PD method to find the virtual ray index "P". The number of projection data to be used for interpolation is proportional to the distance between the underlying pixel and the x-ray source.

2. Calculate the subpixel areas covered by the intercepting rays. Use these areas as interpolation weights for the rays involved.

Given the pixel distance "R", the span of ray indices $\Delta P$ is approximated by $$\frac{\frac{2r}{R}}{\delta\theta},$$

where $\delta\theta$ is the angle of the x-ray subtending each detector. The indices of the rays intercepting the underlying pixel lie in $$\left[P - \frac{\Delta P}{2}, P + \frac{\Delta P}{2}\right].$$

The subareas may be precomputed and stored in a lookup table.

3. Correct the averaging effect due to the overlap of adjacent pixels.

When the pixel's radius is larger than 0.5, the reconstructed image can be modeled as being blurred by a 3×3 averaging kernel "K" defined as $$K = \begin{bmatrix} c & a & c \\ a & 1 & a \\ c & a & c \end{bmatrix}$$

where "a" is proportional to the overlapped area between the four adjacent pixels and "c" is proportional to the overlapped area between the other four diagonal pixels. The deconvolution technique described below is applied to remove this blurring effect.

A deconvolution technique is utilized to compensate for the local averaging effect due to the assumption of overlapping round pixels. Consider a two-dimensional image "Y" which has been blurred by convolving the original image "X" with a blurring kernel "K". In the conventional approach, "X" is restored by deconvolving "Y" in the frequency domain. That is, $$X = F^{-1}\left[\frac{F(Y)}{F(K)}\right]$$

which involves padding "K" with zeros so that it has the same matrix size as "Y", taking a Fourier transform of "Y" and "K", dividing, and applying an inverse Fourier transform. Now, let "K" be a simple 3×3 matrix taking the form of $$K = \begin{bmatrix} 0 & a & 0 \\ a & 1 & a \\ 0 & a & 0 \end{bmatrix}.$$

"K" is called a blurring kernel with coupling factor "a". One may devise a 3×3 matrix $K_i$ such that "X" is approximated by convolving "Y" with $K_i$. Let $K_i$ be defined by the expression:

$$K_i = \begin{bmatrix} 0 & b & 0 \\ b & 1 & b \\ 0 & b & 0 \end{bmatrix},$$

where "b" is the decoupling factor of $K_i$. $K_i$ is also called an anti-blurring matrix. Observe that $$Y \otimes K_i = (X \otimes K) \otimes K_i = X \otimes (K \otimes K_i),$$

where $$K \otimes K_i = K_0 = \begin{bmatrix} 0 & 0 & ab & 0 & 0 \\ 0 & 2ab & a+b & 2ab & 0 \\ ab & a+b & 1+4ab & a+b & ab \\ 0 & 2ab & a+b & 2ab & 0 \\ 0 & 0 & ab & 0 & 0 \end{bmatrix}.$$

To make $Y \otimes K_i \approx X$, the impact of the operator $K_0$ on "X" should be minimized. Here the sum of all the elements in $K_0$ may be forced to equal one, which implies that when "X" is fairly smooth in the 5×5 pixel area and its neighborhood averaging effect approaches zero. This leads to the relationship $$b = \frac{-a}{(4a+1)}$$

In other words, if "Y" is a blurred image of "X" with a blurring kernel "K" with coupling factor "a", a way of minimizing this effect is by convolving "Y" with an anti-blurring kernel $K_i$ of decoupling factor "b" as defined above.

Notice that the blurring matrix can be expanded to include the averaging effect with diagonal pixels, that is, $$K = \begin{bmatrix} c & a & c \\ a & 1 & a \\ c & a & c \end{bmatrix}.$$

Then the correspondent anti-blurring kernel $K_i$ may be specified as follows:

$$K_i = \begin{bmatrix} d & b & d \\ b & 1 & b \\ d & b & d \end{bmatrix}$$

Consequently, the relationship between the coupling and decoupling factors may be described as follows:

$$b = \frac{-a}{(4a + 4c + 1)}$$

and $$d = \frac{-c}{(4a + 4c + 1)}.$$

A generic architecture is described next for implementing the conventional pixel-driven and ray-driven backprojection algorithm with the circular pixel model, both for fan-beam and parallel beam scanners. The steps to be performed are listed below.

1. Quantize all interpolation weights into a set of numbers and pre-store them in a lookup table of "N" addresses by "M" parallel words.

2. To avoid the conflict of memory access, pre-store the projection data in "M" memory banks in an interleaved fashion.

3. To line up the "M" outputs from the lookup table with the "M" projection data, which are simultaneously accessed from the memory banks, rotate the "M" table outputs via simple multiplexers or barrel-shifter.

4. The distance weighting function ($1/R^2$ for fan-beam) is also be pre-multiplied with the interpolation weights, thereby reducing the original $1/R^2$ lookup table and 12×16 multiplier.

FIG. 29 depicts the functional block diagram 190 of the pixel-driven architecture (e.g., similar to that of conventional view pipelining). The architecture for the ray-driven method based on the circular pixel model (implemented with quantized subpixel areas) is very similar to the pixel-driven architecture except that the subarea table (see FIG. 30) identifies multiple weights ($\delta_i$) to be simultaneously multiplied with their corresponding projection data ($G_i$).

Figure 30:
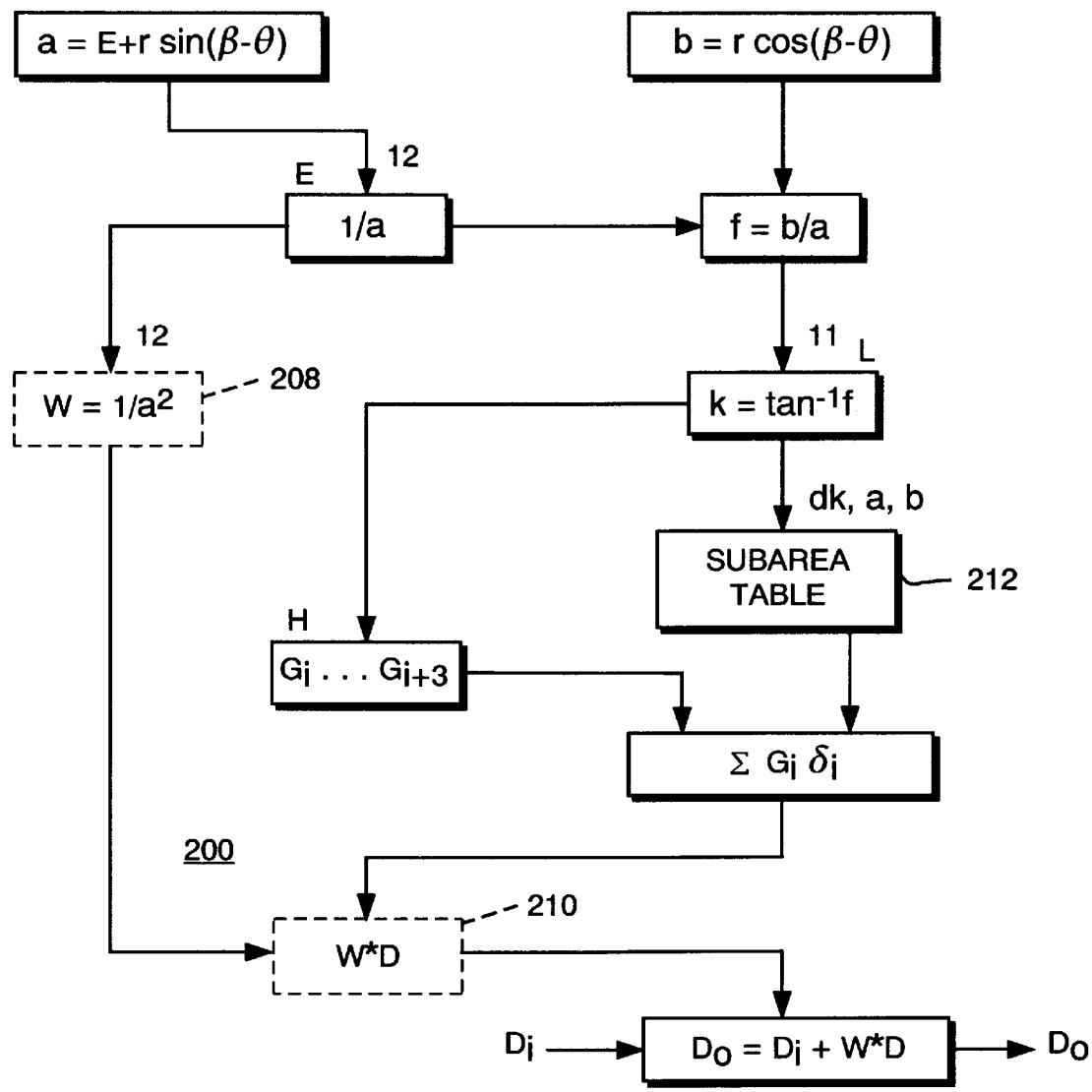
FIG. 30 depicts a generic architecture for multiple back-projection algorithms of the system of FIG. 1.
Figure 31:
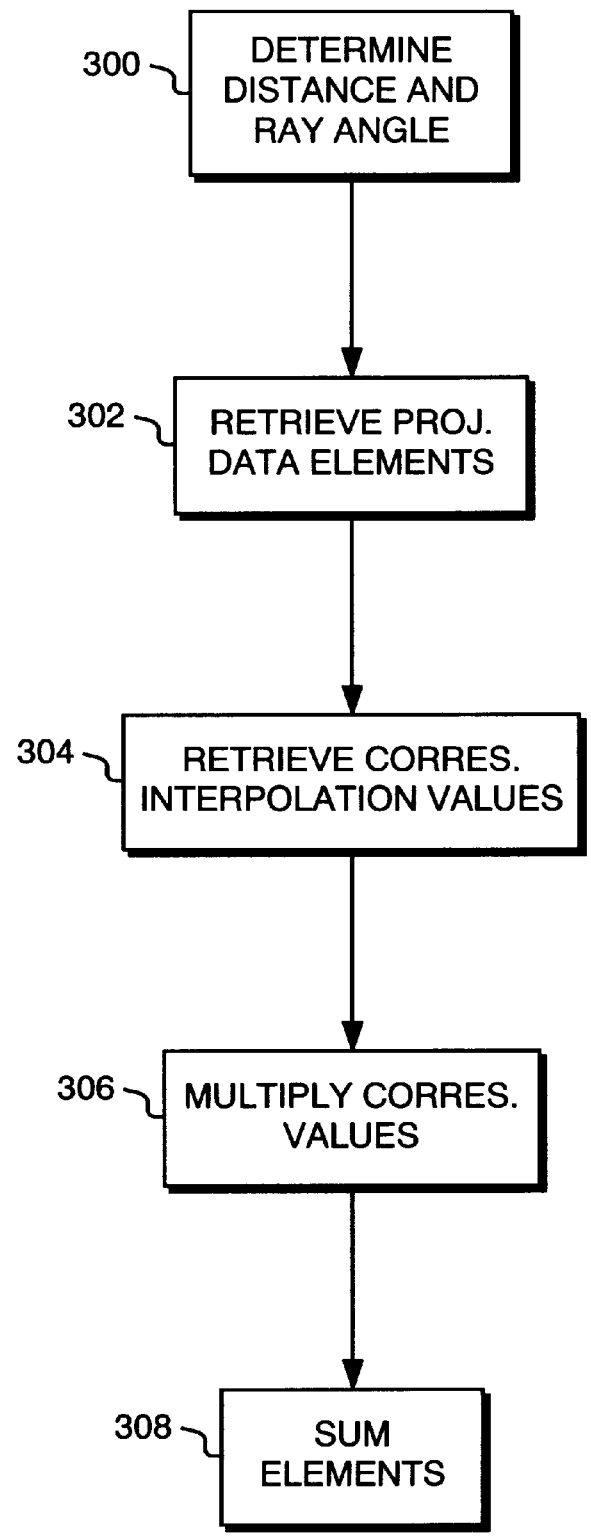
FIG. 31 is a flow chart depicting process steps used by the architecture of FIG. 30.

As indicated in FIG. 30, the operations in the two dashed boxes 208, 210 may be eliminated if the distance function ($1/R^2$) is also quantized and pre-multiplied with the corresponding elements in the sub-area table 212.

There are two implementation issues regarding this generic architecture. Assume that a=R cos(θ) and b=R*sin (θ), θ is the ray angle of the underlying pixel and "R" is the distance between the source and the pixel. The first issue is how to quantize the subareas of the pixels having source distance ranging from $R_{min}$ to $R_{max}$, and the second issue is how to address the table. Stated differently, the second issue relates to the question of how to pair up the "M" projection data with the outputs of the subarea table so that they can be simultaneously used by the multipliers for interpolation.

These issues are addressed as follows. First, a table is formed as an N×M array with N=$N_r$*$N_a$, where $N_r$ is the quantization steps between $R_{min}^2$ and $R_{max}^2$ (in other words, with dr being the step size, $N_r$*dr=$R_{max}^2$−$R_{min}^2$) and $N_a$ is determined by the least significant bit of the number representing the virtual ray that passes a pixel. For instance, if the precision of the virtual ray number is maintained up to the first decimal digit, then $N_a$ is 1/0.1=10. Since the pixel's distance parameters ("a" and "b") and the fractional ray number of the underlying pixel (dk) are known, it is straightforward to address the subarea table by finding $N_i$ (as a measure of ray distance and angle) 300 and using it as an index. $N_i$ is determined as follows:

$$N_i = \frac{(a^2 + b^2 - R_{min}^2)}{dr * dk * N_a}.$$

To pair up the outputs of the projection memory banks and the subarea table, the last $\log_2 M$ bits of the projection memory address are used to determine how far (from among the "M" parallel words) the underlying projection datum deviates from the center of the memory banks. Assume that the integer portion of the current ray number is "K", then it is deviated from the center of the memory banks by dv=mod (k)−M/2. The difference is used to direct the rotation of the outputs of the subarea table. As mentioned earlier, since "M" is normally small, the rotation can be implemented by a multiplexor or barrel shifter.

The result is that projection data (e.g., $G_i$, $G_{i+1}$, $G_{i+2}$) may be simultaneously read 302 from memory based upon an identifier, $N_i$, of a particular ray angle and distance. Using the same identifier $N_i$, a set of "M" parallel words (e.g., interpolation weights $\delta_i$, $\delta_{i+1}$, $\delta_{i+2}$) may be recovered 304 from memory. The projection data is multiplied 306 by a respective interpolation weight and summed 308 to form an intermediate pixel value, W*D. The intermediate pixel value W*D is added to a previous pixel value $D_i$ to form a final pixel solution.

Specific embodiments of methods and apparatuses for providing a generic architecture for a backprojection algorithm according to the present invention have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of updating an image in both ray-driven and pixel-driven tomographic systems, such method comprising the steps of:

determining a distance and a ray angle of a pixel from an X-ray source of the ray-driven tomographic system;

retrieving a plurality of projection data elements based upon the ray angle;

retrieving a corresponding set of interpolation weights from a lookup table based upon the determined distance and ray angle;

multiplying the projection data elements by the interpolation weights; and summing the multiplied projection data elements and interpolation weights to generate an updated pixel.

2. The method of updating an image as in claim 1, further comprising summing the updated pixel with a previously calculated pixel.

3. The method of updating the image as in claim 1, further comprising the step of pre-multiplying the interpolation weights with a distance weighting function.

4. The method of updating the image as in claim 1, further comprising the step of determining an image address for storing the updated pixel.

5. The method of updating the image as in claim 1, further comprising the step of computing a length of a ray segment crossing a pixel square of the pixel.

6. The method of updating the image as in claim 1, further comprising the step of estimating an area of a pixel square of the pixel covered by a ray.

7. The method of updating the image as in claim 6, further comprising the step of computing an updated pixel value using the equation, $f_{xy}=f_{xy}^{(0)}+a_1G_1+a_2G_2+a_3G_3$, where the pixel has associated ray data of $(G_1,S_{r1})$, $(G_2,S_{r2})$ and $(G_3,S_{r3})$ and where $a_1$, $a_2$ and $a_3$ are pixel areas covered by a respective ray.

8. The method of updating the image as in claim 1, further comprising the step of finding an index of a virtual ray passing through the center of the pixel.

9. The method of updating the image as in claim 1, further comprising the step of modeling the pixel as having a round shape.

10. The method of updating the image as in claim 9, wherein the step of modeling the pixel as round further comprises the step of convolving the image, "Y", with an anticoupling kernel $K_i$, where $$K_i = \begin{bmatrix} 0 & b & 0 \\ b & 1 & b \\ 0 & b & 0 \end{bmatrix}, \quad b = \frac{-a}{(4a+1)},$$

11. The method of updating the image as in claim 9, wherein the step of modeling the pixel as round further comprises the step of convolving the image, "Y", with an anticoupling kernel $K_i$, where $$K_i = \begin{bmatrix} d & b & d \\ b & 1 & b \\ d & b & d \end{bmatrix}, \quad b = \frac{-a}{(4a+4c+1)}, \quad d = \frac{-c}{(4a+4c+1)},$$

is a coupling factor.

12. Apparatus for updating an image pixel in a ray-driven tomographic system, such apparatus comprising:
   means for determining a distance and a ray angle of the pixel from an X-ray source of the ray-driven tomographic system;
   means for retrieving a plurality of projection data elements based upon the ray angle;
   means for retrieving a corresponding set of interpolation values from a lookup table based upon the determined distance and ray angle;
   means for multiplying the projection data elements by a respective interpolation value; and
   means for summing the multiplied projection data elements and interpolation values to generate an updated pixel.

13. The apparatus for updating an image pixel as in claim 12, further comprising means for summing the updated pixel with a previously calculated pixel.

14. The apparatus of updating the pixel as in claim 12, further comprising means for pre-multiplying the interpolation values with a distance weighting function.

15. The apparatus for updating the pixel as in claim 12, further comprising means for determining an image address for storing the updated pixel.

16. The apparatus for updating the pixel as in claim 12, further comprising means for computing a length of a ray segment crossing a pixel square of the pixel.

17. The apparatus for updating the pixel as in claim 12, further comprising means for estimating an area of a pixel square of the pixel covered by a ray.

18. The apparatus for updating the pixel as in claim 17, further comprising means for computing an updated pixel value using the equation, $f_{xy}=f_{xy}^{(0)}+a_1G_1+a_2G_2+a_3G_3$, where the pixel has associated ray data of $(G_1,S_{r1})$, $(G_2,S_{r2})$ and $(G_3,S_{r3})$ and where $a_1$, $a_2$ and $a_3$ are pixel areas covered by a respective ray.

19. Apparatus for updating an image pixel in a ray-driven tomographic system, such apparatus comprising:
   a location processor adapted to determine a distance and a ray angle of the pixel from an X-ray source of the ray-driven tomographic system;
   a projection retrieval processor adapted to retrieve a plurality of projection data elements based upon the ray angle;
   an interpolation processor adapted to retrieve a corresponding set of interpolation values from a lookup table based upon the determined distance and ray angle;
   a multiplier adapted to multiply the projection data elements by a respective interpolation value; and
   a summer adapted to sum the multiplied projection data elements and interpolation values to generate an updated pixel.

20. A method of updating a pixel value in an x-ray computer tomography system, such method comprising the steps of:
   determining a filtered projection value of an x-ray passing through the pixel and detected in a detector having a finite width;
   determining an area of the pixel covered by the x-ray;
   multiplying the determined area by the filtered projection value; and
   adding the product of the determined area and filtered projection value to the pixel value.

21. The method of updating a pixel value as in claim 20, wherein the step of determining the area of the pixel covered by the x-ray further comprises moving an origin of a coordinate system of the pixel to a lower left corner of the pixel.

22. The method of updating a pixel value as in claim 21, wherein the step of moving an origin of a coordinate system of the pixel to a lower left corner of the pixel further comprises rotating the pixel so that the x-ray always enters through a top edge of the pixel and exits through one of the left and bottom edges of the pixel.

23. The method of updating a pixel value as in claim 20, wherein the step of rotating the pixel further comprises calculating an area to the right hand side of the x-ray.

24. The method of updating a pixel value as in claim 20, wherein the step of calculating an area to the right hand side of the x-ray further comprises inversely rotating the pixel to said pixel's original position and moving the origin back to its original position.

25. Apparatus for updating a pixel using scan line pixel driven (SLPD) processing and strip integral ray driven (SIRD) processing in an x-ray computer tomography imaging system, such apparatus comprising:
   an area calculator adapted to determine an area of a pixel covered by an x-ray;
   an interpolator adapted to interpolate a pixel contribution from two nearest x-rays based upon an angle of the nearest rays to the pixel; and
   a multiplier adapted to multiply a filtered projection value by one of the area from the area calculator and the interpolation values from the interpolator.

26. The apparatus for updating a pixel as in claim 25, wherein the interpolator further comprises an angle detector adapted to determine angles, $\theta_l$, $\theta_r$ between a line from an x-ray source to a center to the pixel and a nearest x-rays on either side of the pixel respectively.

27. The apparatus for updating a pixel as in claim 26, wherein the interpolator further comprises an angle processor adapted to determine a distance $d_l$, $d_r$ between the center to the pixel and the nearest x-rays on either side of the pixel.

28. The apparatus for updating a pixel as in claim 27, wherein the interpolator further comprises a pixel updating processor adapted to update a pixel value by solving an equation as follows:

$$f(x,y)^{(1)} = f(x,y)^0 + \frac{(G_l d_r + G_r d_l)}{R^3}.$$

29. Apparatus for raster scanning using strip integral ray driven processing, such apparatus comprising:
- an address computer adapted to generate a first and second intersection point where an x-ray crosses a top and bottom edge of a predetermined location on a pixel row;
- an address generator adapted to generate a first and second address;
- a subarea table adapted to retrieve a plurality of pixel areas based upon the first address;
- a plurality of interpolators adapted to interpolate the retrieved pixel areas based upon the first address and a radius distance determined, in part, by the second address;
- an image memory for retrieving a plurality of pixel values based upon the second address; and
- a pixel updating processor for multiplying each pixel of the plurality of pixels by a respective interpolated pixel area of the plurality of interpolated pixel areas and updating a respective pixel location based upon the multiplication.

30. The apparatus for raster scanning as in claim 29, wherein the address generator further comprises an intersection processor adapted to solve for the first and second intersection points $(X_{i,j}, Y_j)$, $(X_{i,j-1}, Y_{j-1})$, by solving a set of equations as follows:

$$X_{i,j} = X_O + (Y_j - Y_o)S_{ri} \text{ and}$$

$$X_{i,j-1} = X_{i,j} - S_{ri},$$

where $X_o, Y_o$ are coordinates of an x-ray source and $S_{ri}$ is a slope of the x-ray.

31. The apparatus for raster scanning as in claim 30, wherein the address generator further comprises a subarea identification processor adapted to generate the first address, addr1, by solving an equation as follows:

$$\text{addr1} = 2^k(3fx + S_{ri} + 1),$$

where "k" is a number of binary bits of a subpixel resolution and 3fx is a fractional portion of $x_{i,j}$.

32. The apparatus for raster scanning as in claim 31, wherein the address generator further comprises a pixel identification processor adapted to generate the second address, addr2, by identifying pixel addresses lying between the first and second intersection points.

33. The apparatus for raster scanning as in claim 32, wherein the pixel updating processor further comprises an arithmetic unit for updating a cumulative pixel value, $f_{k+n}$, by solving an equation as follows:

$$f_{k+n}^{(1)} = f_{k+n}^{(0)} + (E_n G_{i-1} + a_n(G_i - G_{i-1}))R^{-2},$$

where "$E_n$" is a pixel flag, "G" is a filtered projection value, and "R" is a distance to a source of the x-ray.

34. Apparatus for updating a pixel using conventional pixel driven (CPD) processing and strip integral ray driven (SIRD) processing in an x-ray computer tomography imaging system, such apparatus comprising:
- an area calculator adapted to determine an area of a pixel covered by an x-ray;
- an interpolator adapted to interpolate a pixel contribution from two nearest rays based upon a distance of the nearest rays to the pixel; and
- a multiplier adapted to multiply a filtered projection value by one of the area from the area calculator and the interpolation values from the interpolator.

35. The apparatus for updating a pixel as in claim 34, wherein the area calculator further comprises a translation processor adapted to move an origin of a coordinate system of the pixel to a lower left corner and rotate the pixel so that an x-ray always enter from a top edge and exits on one of the left and bottom edge.

* * * * *